United States Patent [19]

Matsumoto

[11] Patent Number: 5,930,532
[45] Date of Patent: Jul. 27, 1999

[54] AUTOMATIC FOCUSING DEVICE OF CAMERA HAVING HIGHLY RELIABLE MOVEMENT PREDICTION FEATURE

[75] Inventor: Hisayuki Matsumoto, Hino, Japan

[73] Assignee: Olympus Optical Co., Ltd., Tokyo, Japan

[21] Appl. No.: 09/080,808

[22] Filed: May 18, 1998

[30] Foreign Application Priority Data

May 28, 1997 [JP] Japan .................................... 9-138390
Apr. 22, 1998 [JP] Japan .................................. 10-112176

[51] Int. Cl.$^6$ .................................................. G03B 13/36
[52] U.S. Cl. ......................... 396/95; 396/104; 396/121; 396/128; 396/153
[58] Field of Search ............................. 396/95, 104, 121, 396/122, 123, 128, 153; 250/201.8, 201.2

[56] References Cited

U.S. PATENT DOCUMENTS

| | | | |
|---|---|---|---|
| 4,860,045 | 8/1989 | Hamada et al. | 396/95 |
| 4,931,820 | 6/1990 | Matsuzawa et al. | 396/93 |
| 4,959,678 | 9/1990 | Nakagawa | 396/121 |
| 4,967,224 | 10/1990 | Hamada et al. | 396/95 |
| 5,208,625 | 5/1993 | Suekane | 396/95 |
| 5,291,300 | 3/1994 | Ueda | 396/153 |
| 5,434,638 | 7/1995 | Ishibashi et al. | 396/95 |
| 5,612,761 | 3/1997 | Nakata | 396/95 |
| 5,649,241 | 7/1997 | Watanabe | 396/153 |
| 5,825,016 | 10/1998 | Nagahata et al. | 250/201.8 |

*Primary Examiner*—W. B. Perkey
*Attorney, Agent, or Firm*—Frishauf, Holtz, Goodman, Langer & Chick, P.C.

[57] ABSTRACT

An automatic focusing device of camera is adapted to control the lens to focus on an object moving along the optical axis of the lens. The focus detecting section of the device outputs a plurality of focus detection signals according to the focused state of the image of the object formed by the camera lens. The correlation computing section of the device computationally determines the correlation between the last focus detection signal and the preceding focus detection signals in order to predict the movement of the object according to the plurality of focus detection signals output from the focus detecting section. A reliability judging section of the device judges the reliability of the outcome of the computationally determining operation of the correlation computing section. The movement judging section judges on the object for mobility or immobility according to the outcome of the computationally determining operation of the correlation computing section and that of the reliability judging operation of the reliability judging section. The movement judging section determines the object to be moving when it judges the outcome of the reliability judging operation of the reliability judging section as poorly reliable.

13 Claims, 18 Drawing Sheets

|  | 1ST BLOCK | 2ND BLOCK | 3RD BLOCK |
|---|---|---|---|
| Sk | 1.73 | 14.1 | 18.2 |
| $\Delta X_R$ | 1.86 | 2.62 | -8.74 |
| $\Delta X_L$ | 1.80 | 2.45 | -8.89 |
| $\Delta X_{01}$ | 0.06 | 0.17 | 0.15 |

FIG. 19

|  | 1ST BLOCK | 2ND BLOCK | 3RD BLOCK |
|---|---|---|---|
| Sk | 1.51 | 1.21 | 1.32 |
| $\Delta X_R$ | 0.04 | 0.02 | 0.02 |
| $\Delta X_L$ | 0.02 | 0 | 0.01 |
| $\Delta X_{01}$ | 0.02 | 0.02 | 0.01 |

FIG. 20

AUTOMATIC FOCUSING DEVICE OF CAMERA HAVING HIGHLY RELIABLE MOVEMENT PREDICTION FEATURE

BACKGROUND OF THE INVENTION

This invention relates to an automatic focusing device of camera having a movement prediction feature of focalizing the lens on a moving object.

There have been proposed various automatic focusing devices having a so-called movement prediction feature of focalizing the shooting lens on a moving object by detecting the amount of movement of the object along the optical axis of the lens, predicting the location of the image plane of the object after a predetermined time and driving the lens to the predicted image plane to focus the lens on the object.

U.S. Pat. Nos. 4,860,045 and 4,967,224 disclose a method of predicting the movement of the object in the release time lag (the time lag of driving the lens, the reflector, etc.) and correcting the focal point of the lens on the basis of the change in the defocus of the camera.

U.S. Pat. No. 5,208,625 assigned to the assignee of the present patent application also discloses a method of predicting the movement of the object by detecting the amount of movement of the object.

A camera having such an movement prediction feature is normally so designed as to judge the moving object to be stationary if the detected amount of movement is smaller than a predetermined value (threshold level of judging for movement) in order to avoid falsely predicting the movement of a stationary object, which is non-existent.

Then, the camera normally does not operate for movement prediction.

Generally speaking, however, none of such known devices are free from errors in detecting the amount of movement of the object due to computational errors, noises appearing on the sensor and other factors.

Because of such errors in detecting the amount of movement of the object, a relatively high threshold level should be selected for the camera for judging on the movement of the object to accommodate the errors. Otherwise, the camera can falsely predict an nonexistent movement of a stationary object and the lens can get out of focus as it hunts for the illusionary moving object back and forth.

If, on the other hand, the threshold level is too high, the camera can mistake a moving object for a stationary object to neglect its mission of predicting the movement of the object.

While it is a general practice to increase the frequency of detecting the amount of movement of the object, thereby minimizing the detection error in order to select a low threshold level for the camera for judging on the movement of an object and, at the same time, minimize the error of mistaking a stationary object for a moving object, a complicated system is then required for controlling the predicting operation including computations for processing the detected data.

BRIEF SUMMARY OF THE INVENTION

In view of the above identified problems, it is therefore an object of the present invention to provide an automatic focusing device of camera that can reliably determine if the object is moving or stationary by simple means.

According to the invention, the above object is achieved by providing an automatic focusing device of camera adapted to control a lens to focus on an object moving along an optical axis of the lens, said device comprising:

focus detecting means for outputting a plurality of focus detection signals with a predetermined interval in response to a focused state of an image of the object formed by said lens;

correlation computing means for computationally determining a correlation between a last focus detection signal and a preceding focus detection signal in order to predict a movement of the object according to the plurality of focus detection signals output from said focus detecting means;

reliability judging means for judging a reliability of a result of a computationally determining operation of said correlation computing means; and movement judging means for judging on the object to be moving or not according to the result of the computationally determining operation of said correlation computing means and a result of a reliability judging operation of said reliability judging means, wherein said movement judging means determines the object to be moving when it judges the result of the reliability judging operation of said reliability judging means as poorly reliable.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 19 is a chart showing the reliability index Sk, the amount of movement in object image signal ΔXL, the amount of movement in object image signal ΔXR and the amount of movement of the image ΔZ01 between time t1 and time t0 computationally determined by using the signals in FIGS. 8A and 8B.

FIG. 20 is a chart showing the reliability index Sk, the amount of movement in object image signal ΔXL, the amount of movement in object image signal ΔXR and the amount of movement of the image ΔZ01 between time t1 and time t0 computationally determined by using the signals in FIGS. 9A and 9B.

DETAILED DESCRIPTION OF THE INVENTION

Figure 1:
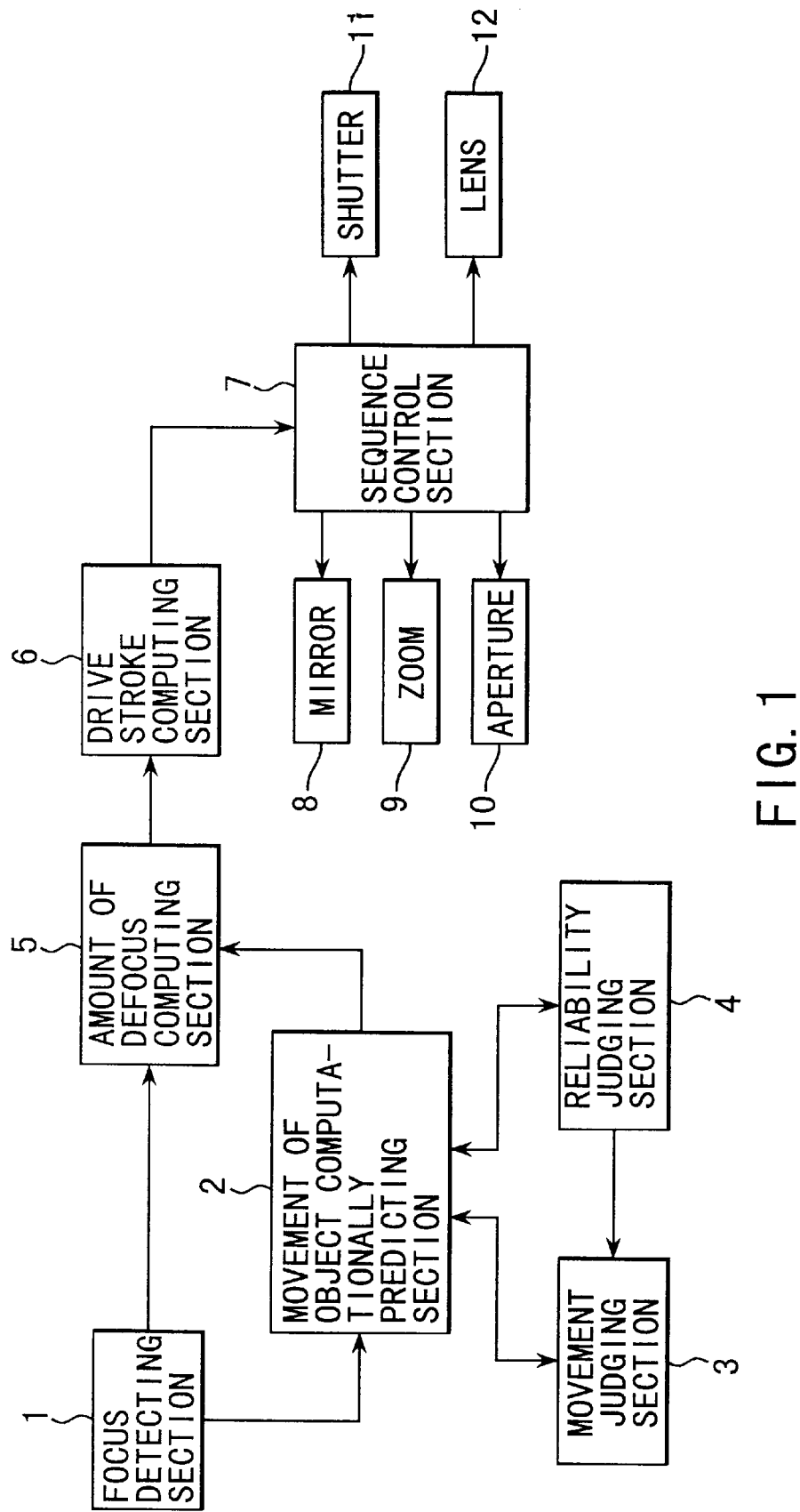
FIG. 1 is a schematic block diagram of a first embodiment of automatic focusing device of camera according to the invention.

Reference will now be made in detail to the presently preferred embodiments of the invention as illustrated in the accompanying drawings, in which like reference characters designate like or corresponding parts throughout the several drawings.

FIG. 1 is a schematic block diagram of a first embodiment of automatic focusing device of camera according to the invention.

Referring to FIG. 1, the embodiment of automatic focusing device comprises a focus detecting section 1 having an AF unit 210 including an AFIC (automatic focusing integrated circuit) 240 as will be described in greater detail hereinafter and a correlation computing section 249 arranged within CPU 201 to perform computational operations for focus detection.

The focus detecting section 1 is connected to a movement of object computationally predicting section 2 that performs computational operations to determine the amount of movement of the object along the optical axis of the lens and computationally predicts the amount of movement of the image of the object to be picked up at the time of exposure to light according to the focus detection signals from the focus detecting section 1 in a manner as described in U.S. Pat. No. 5,208,625 assigned to the assignee of the present patent application.

The movement of object computationally predicting section 2 is by turn connected to a movement judging section 3 for judging on the object for mobility or immobility according to the outcome of the computational operation of said movement of object computationally predicting section 2 for determining the amount of movement of the object along the optical axis and also to a reliability judging section 4 for judging the reliability of the prediction of said movement of object computationally predicting section 2, said movement judging section 3 and said reliability judging section 4 provide a characteristic feature of the present invention.

The judgment of the reliability judging section 4 that characterizes the present invention is then output to said movement of object computationally predicting section 2 and said movement judging section 3.

The movement judging section 3 that characterizes the present invention accurately determines if the object to be photographed is moving or not according to the outcome of the operation of computationally determining the amount of movement of the image due to said movement of object computationally predicting section 2 and the judgment of said reliability judging section 4.

The focus detecting section 1 is additionally connected to an amount of defocus computing section 5 for computationally determining the amount of defocus of the lens.

The amount of defocus computing section 5 determines the amount of defocus according to the focus detection signal from said focus detecting section 1 and the output of said movement of object computationally predicting section 2 in order to focus on a moving object. It also determines the current amount of defocus without in order to focus on a stationary object by passing the operation of predicting the movement of a moving object.

The output signal of the amount of defocus computing section 5 is then sent to the drive stroke computing section 6.

The drive stroke computing section 6 operates to computationally determine the drive stroke of the lens necessary for focusing on a moving object.

The sequence control section 7 operates to control the operating sequence of the entire camera and corresponds to the CPU 201 as described above.

The sequence control section 7 is connected to the shutter, the lens, the mirror, the zoom, the iris diaphragm and other components of the camera.

Now, a camera system to which the first embodiment of automatic focusing device is applicable will be described in detail.

Figure 2:
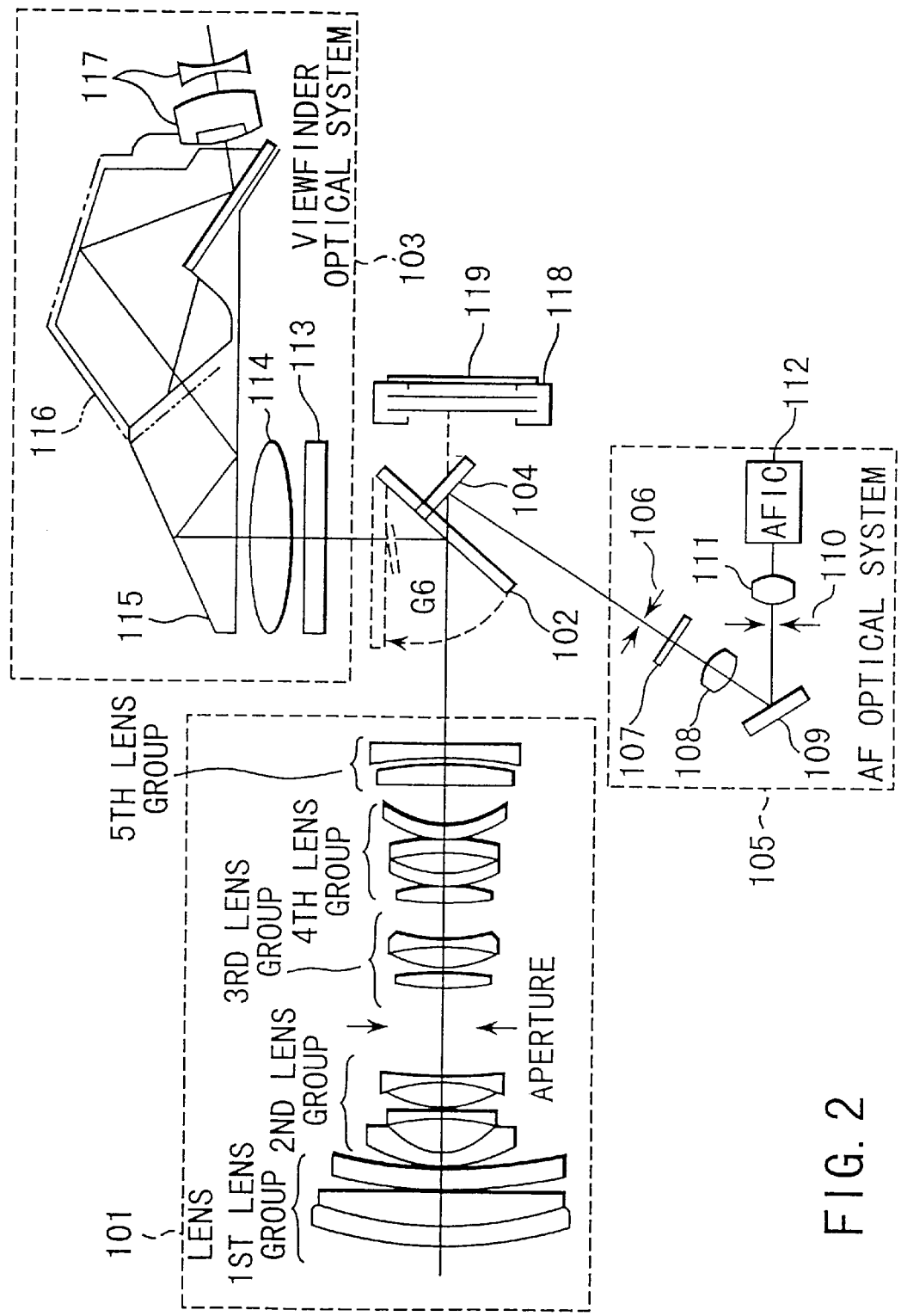
FIG. 2 is a detailed illustration of an optical system to which the first embodiment of automatic focusing device of camera can be applied.

FIG. 2 is a detailed illustration of an optical system to which the first embodiment of automatic focusing device of camera can be applied.

Note that FIG. 2 specifically illustrates an optical system comprising a zoom lens.

Referring to FIG. 2, the rays of light from the object, an image of which is to be picked up by the camera, strike a main mirror 102 by way of a lens unit 101 comprising five lens groups and an iris diaphragm.

The lens unit 101 is so adapted that the first and second groups operate for focusing and the third and fourth groups operate for zooming, while the fifth group is held stationary.

With the lens, when the third and fourth groups are driven, the first and second group are also driven by means of a cam system to prevent the object from going out of focus while the lens is being zoomed.

Said main mirror 102 is in fact a semi-reflecting mirror that reflects two thirds of the incident light to viewfinder optical system 103 and transmits the remaining a third of the incident light, which is then reflected by a sub-mirror 104 and then led to a downstream AF optical system 105.

The AF optical system 105 comprises a field aperture 106, an infrared-ray filter 107, a condenser lens 108, a mirror, a re-imaging aperture 110, a reimaging lens 111 and an AFIC 112.

The visual field aperture 106 determines the visual field to be AF-detected from the image picked up by the camera in such a away that the two optical images split by the re-imaging lens 111 would not interfere with each other.

The infrared-ray cutting filter 107 removes infrared rays that are not necessary for AF detection in order to avoid aberrational blurs due to infrared rays.

The condenser lens 108 is located on the imaging plane of the lens 101 for the object, which is located close to the film-equivalent plane.

The condenser lens 108 cooperates with the reimaging lens 111 to rearrange the image of (re-image) the object formed near the film equivalent plane on a pair of rows of photoelectric transducers on the AFIC 112.

Since the re-imaging aperture 110 arranged between the condenser lens 108 and the re-imaging lens 111 in fact consists in tow aperture halves, the two fluxes of light that pass through the condenser lens 108 are focused on the respective photoelectric transducers on the AFIC 112.

The viewfinder optical system comprises a focusing screen 113, a condenser 114, a prism 115, a mold roof mirror 116 and an eyepiece 117.

Thus, after passing the lens 101, the flux of light produces an image on the focusing screen 113.

The image produced on the focusing screen 113 is then viewed by the camera operator by way of the condenser 114 and the eyepiece 117.

The main mirror 102 and the sub-mirror 104 retract to the respective positions shown by phantom lines in FIG. 2 (as indicated by arrow G6 in FIG. 2) when the object is actually shot by the camera.

Thus, the film 119 is exposed to the light from the object that passes through the lens 101 between the time when the front curtain is opened and the time when the rear curtain is closed.

Figure 3:
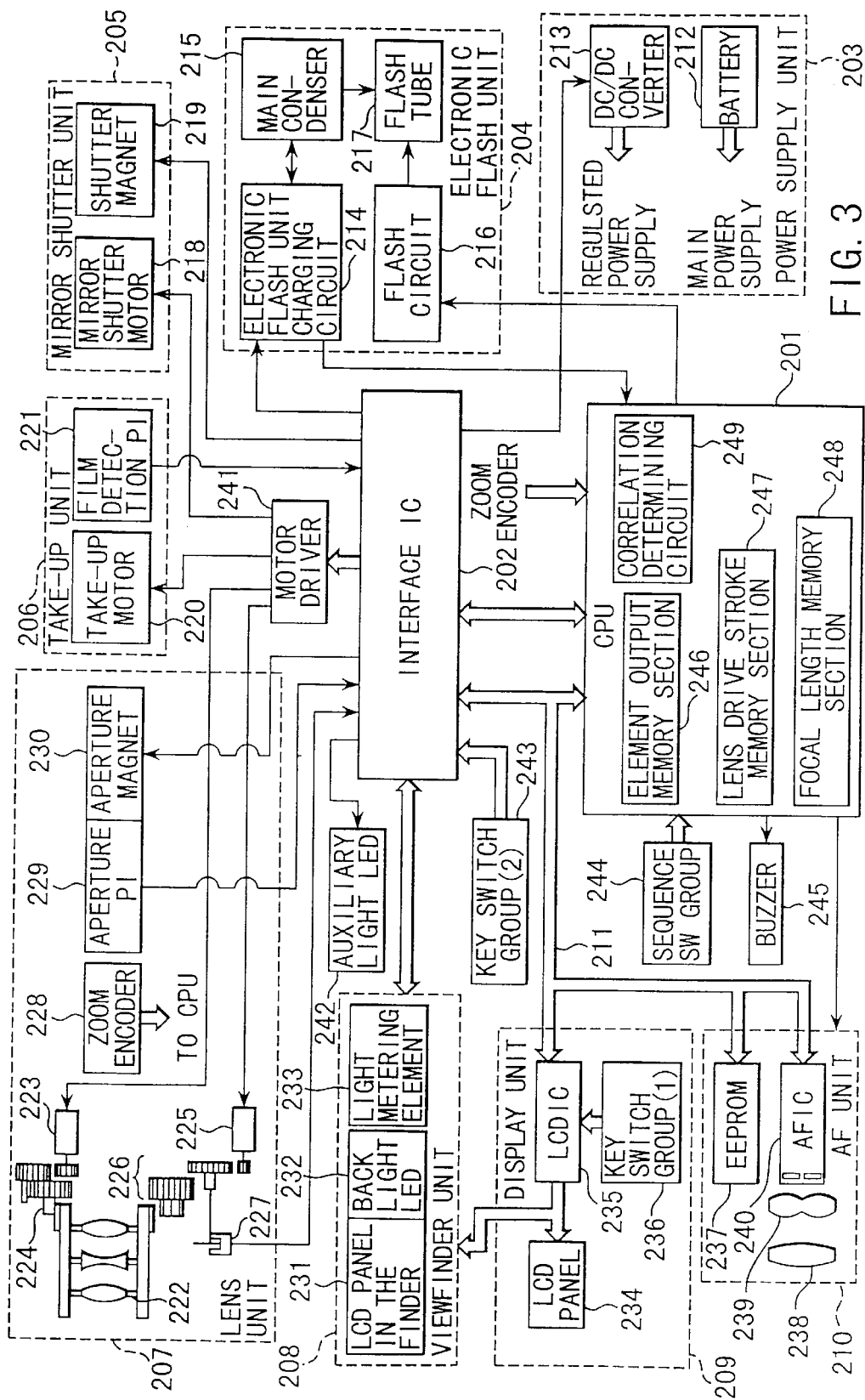
FIG. 3 is a detailed block diagram of the control system of a camera to which the first embodiment of automatic focusing device can be applied.

FIG. 3 is a detailed block diagram of the control system of a camera to which the first embodiment of automatic focusing device of camera can be applied.

Referring to FIG. 3, the camera system to which the first embodiment of automatic focusing device is applied comprises a CPU 201, an interface IC 202, a power supply unit 203, an electronic flash unit 204, a mirror shutter unit 205, a take-up unit 206, a lens unit 207, a viewfinder unit 208, a display unit 209 and an AF unit 210.

The CPU 201 is responsible for controlling the entire operation of the camera system and exchanges data with the interface IC 202, the LCDIC 235, the AFIC 240 and the EEPROM 237 by way of a serial communication line 211.

The CPU 201 and the interface IC 202 are also connected by way of another communication line for transmitting analog signals and signals that have had the waveform rectified by a PI to the CPU 201.

Analog signals are applied to the input terminal of the A/D converter of the CPU 201 for analog/digital conversion.

Otherwise, the CPU 201 comprises a computing section, a memory section for storing data and a time measuring section.

The interface IC 202 is in fact a Bi-CMOSIC having a mixture of digital and analog circuits and comprises an analog processing section including circuits for driving the motor, the magnet and etc., metering light, checking the battery and controlling the LED for auxiliary light as well as the waveform shaping circuit and other circuits and a digital processing section for controlling the operation of the switch (SW) for transforming input serial communication data and other operations.

The power supply unit 203 supplies power by way of two supply systems.

One of the supply systems of the power supply unit 203 is used to drive the motor and the magnet, constantly applying a voltage from battery 212.

The other is used to supply power regulated by a DC/DC converter 213 for small signals. Its operation is controlled by the CPU 201 by way of the interface IC 202.

The electronic flash unit 204 comprises an electronic flash unit charging circuit 214, a main condenser 215, a flash circuit 216 and a flash tube 217.

When an electronic flash is required to take a picture in a dark environment or in back light, the electronic flash unit charging circuit 214 raises the voltage of the power being supplied from the battery to charge the main condenser 215 according to the control signal from the CPU 201.

At the same time, the charging voltage obtained by the voltage dividing operation of the electronic flash unit charging circuit 214 is applied to the input terminal of the A/D converter of the CPU 201.

Thus, the CPU 201 can control the charging voltage.

Once the charging voltage gets to a predetermined level, the CPU 201 transmits a charging stop signal to the electronic flash unit charging circuit 214 by way of the interface IC 202 to terminate the operating of charging the main condenser 215.

The CPU 201 also controls the flashing effect of the flash tube 217 in terms of start and end of flashing by way of the flash circuit 216.

The mirror shutter unit 205 comprises a mirror shutter drive motor 218, a pair of shutter magnets 219 for respectively controlling the stroke of the front curtain and that of the rear curtain and a switch for detecting the end-of-stroke of the rear curtain that belongs to a sequence switch group 244.

The mirror shutter drive motor 218 is controlled for its operation by the CPU 201 by way of the interface IC 202 and a motor driver 241. It moves the main mirror 102 up and down, sets the aperture of the shooting lens and drives the shutter to operate (by closing the front curtain and opening the rear curtain).

The shutter magnets 219 are controlled by the CPU 201 by way of the interface IC 202.

Firstly, before an exposure sequence starts, the main mirror is retracted and the lens aperture is set by the mirror shutter drive motor 218 running forwardly.

Then, the shutter magnets 219 are electrically energized and attracted to start exposure and the front curtain is opened as the shutter magnet 219 of the front curtain is released from the attracted state.

Then, the switch for detecting the end-of-stroke of the front curtain that also belongs to the sequence switch group 244 is turned on at the end of the specified exposure time to release the shutter magnet 219 of the rear curtain from the attracted state and close the rear curtain.

Thus, the film is exposed to the light from the object between the time when the front curtain is opened and the time when the rear curtain is closed.

Then, the mirror is moved down by the mirror shutter drive motor 218 running forwardly to open the lens aperture.

At the same time, the shutter is driven to move.

The film is wound back when the shutter drive motor 218 is made to run reversely.

The take-up unit 206 comprises a take-up motor 220 and a film detection photo-interrupter (PI) 221.

The take-up motor 220 is controlled by the CPU 201 by way of the interface IC 202 and the motor driver 241.

The output of the film detection PI 221 is subjected to a waveform shaping operation at the interface IC 202 and then transmitted to the CPU 201 in order to generate take-up stroke feedback pulses.

The CPU 201 controls the stroke of advancing the film by a single frame by counting the number of pulses.

The lens unit 207 comprises a shooting lens 222, a zoom motor 223, a zoom gear train 224, an AF motor 225, an AF gear train 226, an AFPI 227, a zoom encoder 228, an aperture PI 229 and an aperture magnet 230.

Of these, the zoom motor 223 and the AF motor 225 are controlled by the CPU 201 by way of the interface IC 202 and the motor driver 241.

The rotation speed (r.p.m.) of the zoom motor 223 is reduced by the zoom gear train 224 before the zooming system of the shooting lens 222 is driven by the motor.

The zoom encoder 228 comprises six switches arranged around the frame supporting the lens 222 and the data on the six switches are fed to the CPU 201 as they are turned on and off in order to detect the absolute position of the zoom lens.

The CPU 201 determines the focal length of the lens from its absolute position and stores it in the focal length memory section 248.

The rotation speed (r.p.m.) of the AF motor 225 is reduced by the AF gear train 226 before the focusing system lens of the shooting lens 222 is driven by the motor.

The output of the AF PI 227 is subjected to a waveform shaping operation at the interface IC 202 and then transmitted to the CPU 201 in order to generate AF drive stroke feedback pulses.

The CPU 201 controls the stroke of driving the AF lens by counting the number of AF drive stroke feedback pulses.

The distance from the mechanical stopper or the infinite reference position of the AF lens is translated into the number of pulses for the AFPI 227 and stored in the lens drive stroke memory section 247 arranged in the CPU 201.

The aperture magnet 230 is controlled by the CPU 201 by way of the interface IC 202 and electrically energized to become attracted the instance when the mirror starts moving up.

The iris diaphragm of the lens starts to be driven mechanically by means of a spring also the instance when the mirror starts moving up as it is driven by the mirror shutter drive motor 218 of the mirror shutter unit 205.

When the iris diaphragm gets to show an intended aperture, the aperture magnet 230 is released from the attracted state to maintain the iris diaphragm in the selected state.

The output of the aperture PI 229 is subjected to a waveform shaping operation at the interface IC 202 and then transmitted to the CPU 201 in order to generate iris diaphragm drive stroke feedback pulses.

The CPU 201 controls the stroke of driving the iris diaphragm by counting the number of iris diaphragm drive stroke feedback pulses.

The viewfinder unit 208 comprises an intra-finder LCD panel 231, a back light LED 232 and a photometric octamerous photodiode 233.

The intra-finder LCD panel 232 is made of transmission type liquid crystal and controlled by an LCDIC 235 according to the display data transmitted from the CPU 201 to the LCD IC 235.

The back light LED 232 is controlled by the CPU 201 by way of the interface IC 202 for its on/off operation in order to illuminate the intra-finder LCD panel 231.

The photometric device 233 is controlled by the CPU 201 by way of the interface IC 202.

The photoelectric current generated by the photometric device 233 is sent to the interface IC 202 for each of the eight elements of the device and subjected to an internal current/voltage conversion.

Then, only the output of the element specified by the CPU 201 is sent from the interface IC 202 to the A/D conversion input terminal of the CPU 201 and converted into digital data, which is then used for a photometric arithmetic operation.

The display unit 209 comprises an external LCD panel 234, an LCDIC 235, a key switch (SW) group (1) 236.

The LCD panel 234 is made of reflection type liquid crystal and controlled by the LCDIC 235 according to the display data transmitted from the CPU 201 to the LCDIC 235.

The key switch group (1) 236 is used mainly for selecting a mode of operation of the camera and comprises an AF mode selection switch, a camera exposure mode selection switch, an electronic flash mode selection switch, an AF/PF change-over switch and an micro mode switch.

The switches are operated for mode selection as the state of each of them is read into the CPU 201 by way of the LCDIC 235.

The optical image is then split into two images by the condenser 238 and the separator lens 239, which two images are then received by the respective rows of photoelectric transducers on the AFIC 240.

The AFIC 240 produces an analog output according to the intensity of light of each of the transducers.

The output according to the intensity of light of each of the transducers is then sent to the A/D conversion input terminal of the CPU 201 and converted into a digital signal, which is then stored in the transducer output memory section 246.

The CPU 201 computes the distance between the two images or the amount of movement of each of the images after a predetermined time by means of the internal correlation determining circuit 249.

Furthermore, the CPU 201 controls the operation of photoelectric conversion of the AFIC 240.

The EEPROM 237 is made to store data for correcting disuniformity of data in the output of photoelectric transducers and data for various regulating operations including that of regulating the distance between the two images when the object to be photographed is in focus typically after the manufacture and prior to the shipment of the camera from plant.

The EEPROM 237 is also made to store data necessary to be preserved if the power supply is turned off while the camera is in operation including the number of frames that have been used.

The motor driver 241 is used to control the motors that consume power at an enhanced rate such as the mirror shutter drive motor 218, the take-up motor 220, the zoom motor 223 and the AF motor 225.

The auxiliary light LED 242 is designed to be turned on when the AFIC 240 does not finish its operation of photoelectric conversion within a predetermined period of time and hence the distance between the two images cannot be detected so that the AFIC 240 can continue the operation of photoelectric conversion for the object illuminated by the lighting system.

The key switch (SW) group (2) 243 is used to control the operation of the camera.

The group includes a first stroke signal (1R) release switch, a second stroke signal (2R) release switch, a switch for driving the zoom lens toward the long-focus side, a switch for driving the zoom lens toward the short-focus side and a switch for storing the spot-metered values.

The switches are controlled for operation as the state of each of them is read into the CPU 201 by way of the interface IC 202.

The sequence switch (SW) group 244 is used to detect the status quo of the camera in various different terms.

The group includes a switch for detecting the raised position of the mirror, a switch for detecting the end-of-shutter-operation, a switch for detecting the end-of-stroke of the shutter front curtain, a power supply switch and a switch for detecting the popped up state of the electronic flash.

The buzzer 245 sounds when the AF is in-focus or out-of-focus, when the power supply switch is turned on and when the camera is shaken as well as in other occasions.

Now, the operation of computationally determining the correlation of the signals for the two images of the object in order to predict the movement of the object will be described in detail.

The first embodiment of automatic focusing device according to the invention executes two computational operations.

One of the operations is used to determine the amount of defocus from the relative displacement of the two images by determining the correlation between the first image and the second image of the object split by the re-imaging lens 111 as described in U.S. Pat. No. 5,208,625, which is assigned to the assignee of the present patent application, in terms of a known infocus state detecting device.

The other is used to determined the amount of movement of the object by computationally determining the correlation between the image of the object at time t0 and that of the object at time t1.

Firstly, the computational operation for determining the correlation between the first image and the second image of the object will be described.

For the purpose of convenience, assume that the first image of the object is L and the signal for the first image is L(I), whereas the second image of the object is R and the signal for the second image is R(I).

I represents the number of transducer element e.g. pixel and the transducer elements are numbered by 1, 2, 3, . . . , 64 from left to right in this embodiment.

Now, the computational operation for determining the correlation will be described by referring to FIG. 4.

Firstly, 1, 20 and 8 are set in the CPU 201 as initial values for variables SL, SR and J (Steps A1 and A2).

The variable SL is used to stored the number of the leading pixel of the row of transducers of the small block to be used for detecting the correlation from the object image signal L(I).

Similarly, the variable SR is used to stored the number of the leading pixel of the row of transducers of the small block to be used for detecting the correlation from the object image signal R(I).

The variable J is used to count the number of movements of the small block in the object image signal Then, the CPU 201 compute the correlation output F(s) by means of the equation (1) below;

$$F(S) + \sum_{I=0}^{43} |L(SL + I) - R(SR + I)| \tag{1}$$

where S=SL-SR (Step A3).

Note that the number of devices (pixels or elements) in the small block is 44.

The number of pixels in the small block is determined by the size of the AF frame displayed on the viewfinder and the magnification of the detection optical system.

Then, the CPU 201 detects the minimal value FMIN of the correlation output F(s) (Step A4).

More specifically, the CPU 201 compares F(s) with FMIN and, if F(s) is smaller than FMIN, substitutes FMIN with F(s). Then, it stores SL and SM at this time in SLM and SRM respectively (Step A5) and proceeds to Step A6.

If, on the other hand, it is found in Step A4 that F(s) is greater than FMIN, the CPU 201 directly proceeds to Step A6.

At Step A6, the CPU 201 subtracts 1 from SR and also from J.

The CPU 201 repeats the computation using the correlation formula (1) unless j is equal to 0 (Step A7).

In other words, the CPU 201 computationally determines the correlation by displacing the small block for image R by one pixel each time, while fixedly keeping the location of the small block for image L.

When J is found equal to 0, the CPU 201 adds 4 to SL and 3 to SR and then continues the computational operation of the formula (1).

In other words, the CPU 201 repeats the computation using the correlation formula (1) by displacing the small block for image L by four pixels each time until SL becomes equal to 17, when it terminates the computation (Step A9).

Thus, the CPU 201 carries out computation efficiently to detect the minimal value for the correlation output.

The location of the small block showing the minimal value for the correlation output represents the locational relationship between the image signals that are most highly correlated.

Then, the CPU 201 determines the correlation between the image signals that are detected to be most highly correlated.

Firstly, the CPU 201 determines the values for FM and FP as shown equations (2) and (3) below.

$$FM = \sum_{I=0}^{43} |L(SLM + I) - R(SRM + I - 1)| \tag{2}$$

-continued $$FP = \sum_{I=0}^{43} |L(SLM + I) - R(SRM + I + 1)| \quad (3)$$

In other words, the CPU 201 determines the correlation output for the object R when the block is displaced by ±1 pixels from the location where the block shows the minimal value for the correlation output.

Figure 5A:
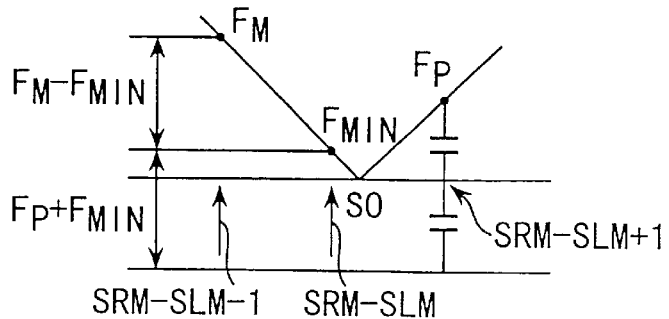
FIGS. 5A and 5B are graphs illustrating a characteristic aspect of strongly correlated images and the comparable characteristic aspect of poorly correlated images.
Figure 5B:
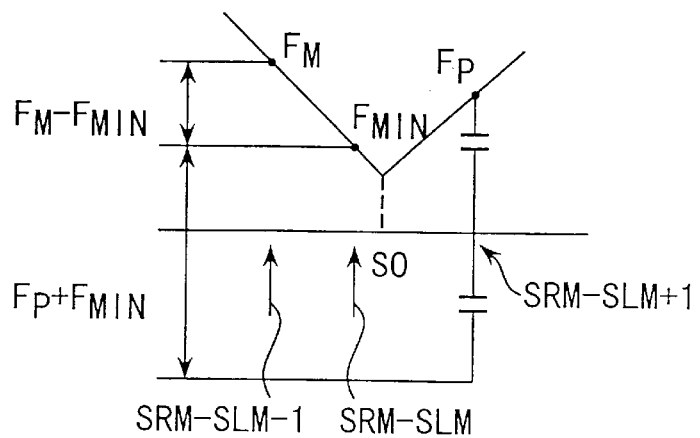

At this time, FM, FMIN and FP shows the relationship as illustrated in FIGS. 5A or 5B.

When the detected distance between the images indicates a high correlation, the correlation output F(s) will be 0 at point SO as shown in FIG. 5A.

When, on the other hand, the detected distance indicates a low correlation, the correlation output F(s) will not be 0 at point SO as shown in FIG. 5B.

Then, the CPU 201 determines the correlation coefficient Sk as defined by equations (4) and (5) below;

$$Sk=(FP+FMIN)/(FM-FMIN) \quad (4)$$

when FM≧FP and $$Sk=(FM+FMIN)/(FP-FMIN) \quad (5)$$

when FM<FP.

The correlation coefficient will be Sk=1 when the correlation is high and Sk>1 when the correlation is low as seen from FIGS. 5A and 5B.

Therefore, the CPU 201 can determine if the detected amount of image shift is reliable or not on the basis of the value of the correlation coefficient Sk (Step A12).

In fact, the correlation coefficient Sk will not be equal to 1 because the variances in the optical system, the noise in the photoelectric transducers, the conversion errors and other factors give rise to discrepancy between image L and image R of the object.

Therefore, the CPU 201 determines that a correlation exists and computes the amount of image shift when Sk≦α (Steps A13 and A15).

On the other hand, it determines that a correlation does not exist and hence the detection of AF is impossible when Sk>α.

Note that the value of a is typically between 2 and 3.

A relatively large value should be selected for a when the auxiliary light LED is turned on because the level of correlation is adversely affected by the color and the aberration of the auxiliary light.

If the CPU 201 determines that a correlation exists, it then determines the distance SO between image L and image R by means of equation (6) or (7) below on the basis of the relationship found in FIGS. 5A and 5B;

$$SO=SRM-SLM+(½)·\{(FM-FP)/(FM-FMIN)\} \quad (6)$$

when FM≧FP and $$SO=SRM-SLM+(½)·\{(FP-FM)/(FP-FMIN)\} \quad (7)$$

when FM<FP.

Then, the CPU 201 determines the amount of image shift ΔZd from the in-focus position by means of equation (8) below;

$$\Delta Zd=SO-\Delta ZO \quad (8)$$

where ΔZO is the amount of image shift at the in-focus position determined for each camera and stored in the EEPROM 237 before shipment.

Note that, in the following description, the value of SO obtained for the first time at time t0 is ΔZ1, that of SO obtained for the second time at time T2 is ΔZ2 and that of SO predicted for the future at time t2 is ΔZ'.

The amount of defocus ΔD on the optical axis can be obtained from the amount of image shift ΔZd by means of equation (9) below;

$$\Delta D=B/(A-\Delta Zd)-C \quad (9)$$

where A, B and C are constants specific to the optical system of the camera.

Various techniques have been proposed for determining the drive stroke of lens ΔL from the amount of defocus ΔD and hence will not be described here in detail.

For example, U.S. Pat. No. 4,931,820 discloses a method of determining the drive stroke of lens ΔL by means of equation (10) shown below;

$$\Delta L=b-(a \times b)/(a+\Delta D)+c \times \Delta D \quad (10)$$

where a, b and c are constants determined for each focal length.

If the movement of the object to be photographed is not considered unlike the description that follows, it will be put into an in-focus state only by driving the camera lens by ΔL.

In this embodiment, the movement of the object to be photographed is determined by means of a technique disclosed in U.S. Pat. No. 5,208,625, which is assigned to the assignee of the present patent application.

Now, the computational operation for determining the amount of movement of the object to be photographed will be described here.

The images L'(I) and R'(I) of the object, the locations SLM' and SRM' of the correlation block obtained by the above described computational operation for the two images, the correlation coefficient Sk' and the image shift ΔZ at time t0 are temporarily stored in the memory area of the CPU 201.

Then, the CPU 201 detects the image signals L(I) and R(I) of the object at time t1.

Firstly, the CPU 201 executes a computational operation on the correlation between the image signal L'(I) at time t0 and the image signal L(I) at time t1 for image L of the object.

Figure 7:
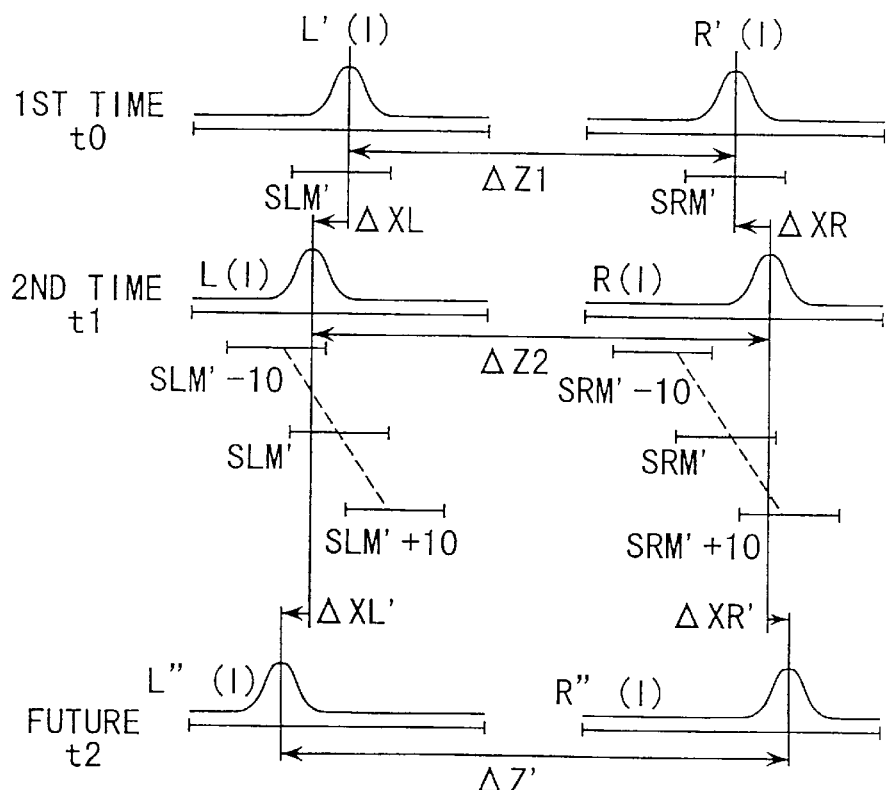
FIG. 7 is a schematic illustration of the method of computationally determining the amount of movement of image L.

This operation of determining the correlation will be described by referring to the flow chart of FIG. 6 and the graph of FIG. 7.

Note that only the technique for determining the amount of movement of image L because the same technique can be used for determining the amount of movement of image R.

Figure 6:
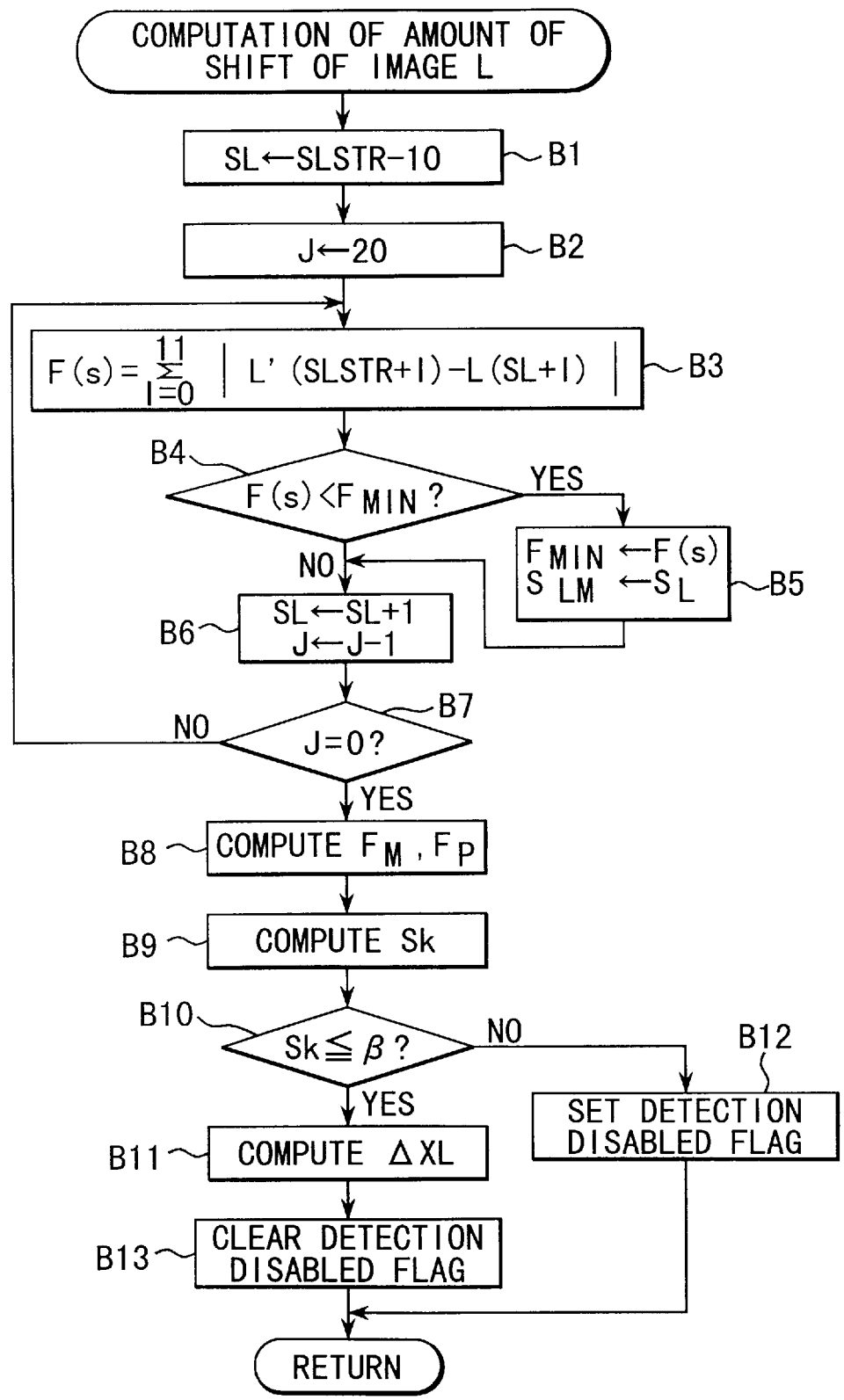
FIG. 6 is a flow chart illustrating the sequential steps of the operation of computationally determining the amount of movement of image L.

Referring to FIG. 6, variable SL is substituted by SLSTR-10 (Step B1).

SLSTR is the pixel number when the computational operation is started as will be described in greater detail hereinafter.

Variable J is used for counting the scope of correlation and substituted here by an initial value of 20 (Step B2).

Then, in Step B3, the CPU 201 computes the correlation output F(s) by means of equation (11) below.

$$F(S) = \sum_{I=0}^{11} |L'(SLSTR + I) - L(SL + I)| \quad (11)$$

Thereafter, the CPU 201 compares F(s) and FMIN in a manner as described earlier (Step B4) and, if F(s) is smaller than FMIN, substitutes FMIN with F(s). Then, it stores SL at this time in SLM (Step B5).

Note that the number of pixels of the block for which a correlation is determined is 12, which is smaller than the number of pixels of the block used for determining the amount of image shift, or 44, as described earlier.

The CPU 201 adds 1 to SR and subtracts 1 from J (Step B6).

The CPU 201 repeats the computation using the correlation formula (1) until J is found to be equal to a negative number (Step B7).

While the computation is performed for ±10 pixels in this embodiment, the number of pixels or the scope of computation is determined as a function of the scope of image shift to be detected.

More specifically, if the focal length is short and hence the object to be photographed is relatively bright, a relatively small scope will be selected for the computation because the amount of image shift is expected to be relatively small for the object.

Contrary, a relatively large scope will be selected for the computation if the amount of image shift is expected to be relatively large for the object.

Then, the CPU 201 performs computations for equations (12) and (13) to determine the values of FM and FP respectively as in the above described case of time t0 (Step B8).

$$FM = \sum_{I=0}^{11} |L'(SLSTR + I) - L(SLM + I - 1)| \qquad (12)$$

$$FP = \sum_{I=0}^{11} |L'(SLSTR + I) - L(SLM + I + 1)| \qquad (13)$$

Then, the CPU 201 determines the correlation coefficient Sk as defined by equations (4) and (5) above.

Therefore, the CPU 201 determines that a correlation exists and computes the amount of image shift when $Sk \leq \beta$ (Step B10).

The threshold value $\beta$ for correlation is typically greater than a used for determining the distance between the images at time t0 (or $\beta$ is typically equal to about 7).

This is because the signal waveform can fluctuate frequently to show a poor correlation when the object to be photographed is moving.

Additionally, a poor correlation will also result when the amount of movement of the object is large so that a large value will be selected for the threshold value á when the focal length of the camera is large, when the distance between the object and the camera is short or when a large value is selected for the time interval between time t0 and time t1 to accommodate the relatively poor brightness of the object.

Thereafter, the CPU 201 determines the amount of movement ΔXL of the image (Step B11).

Note that the CPU 201 uses equations (14) and (15) below as in the case of determining the distance between the images at time to;

$$\Delta XL = SLM - SLSTR + (\tfrac{1}{2}) \cdot \{(FM-FP)/(FM-FMIN)\} \qquad (14)$$

when $FM \geq FP$ and $$\Delta XL = SLM - SLSTR + (\tfrac{1}{2}) \cdot \{(FM-FP)/(FP-FMIN)\} (15)$$

when FM<FP.

Then, the CPU 201 clears the detection disabled flag (Step B13) and returns.

Similarly, the CPU 201 executes the computational operation for determining the correlation for image R and determines the location of correlation block SRM and the amount of movement ΔXR.

As the amounts of movement ΔXL and ΔXR are determined for images L and R of the object, the distance ΔZ2 between the two images at time t1 can be obtained by means of the distance ΔZ1 at time t0 and equation (16) below.

$$\Delta Z2 = \Delta Z1 + \Delta XR - \Delta XL \qquad (16)$$

Figure 4:
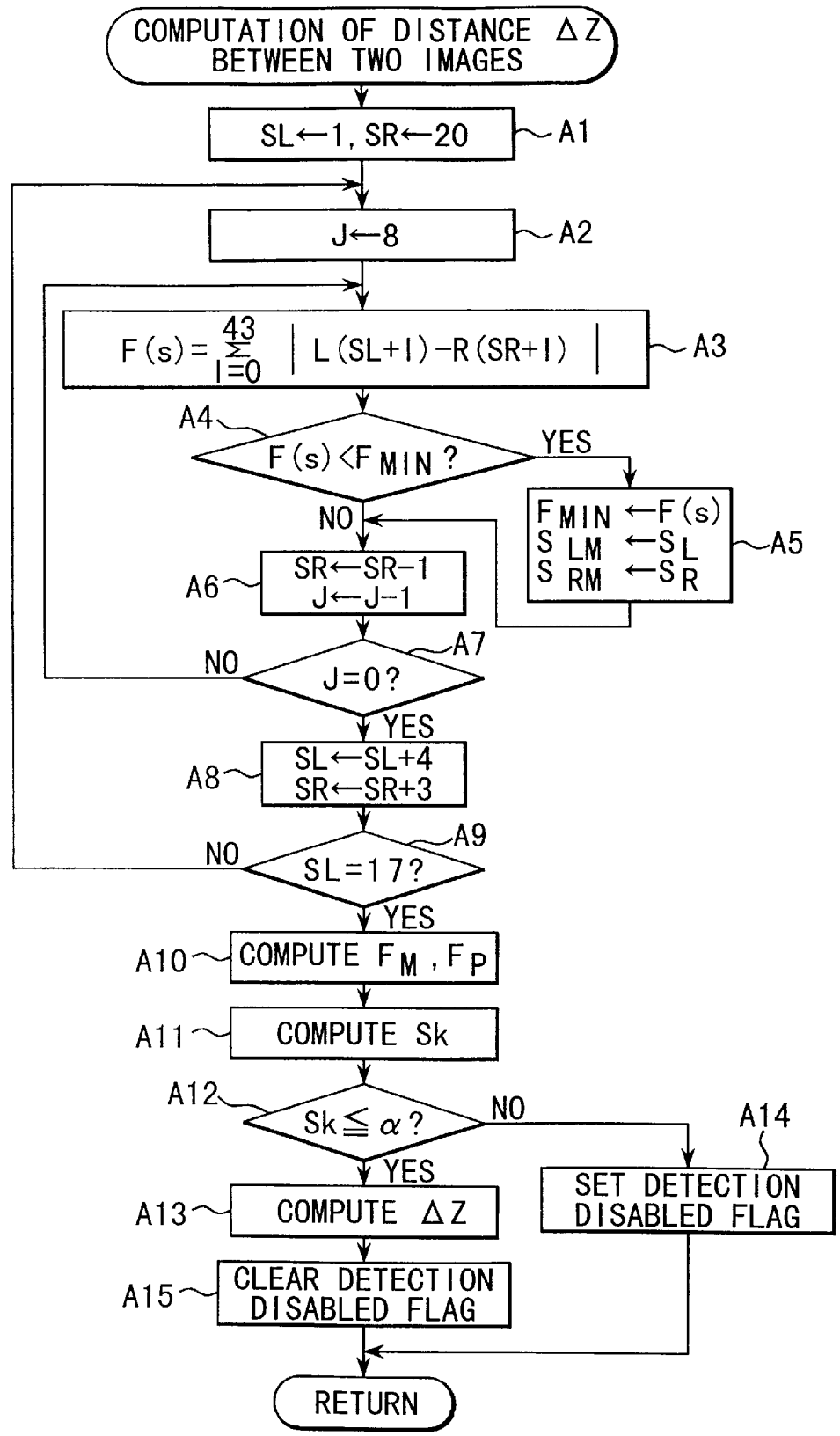
FIG. 4 is a flow chart of the operation of computationally determining a correlation for the purpose of the invention.

In order to minimize the operational error, the distance between the two images ΔZ2 may alternatively be obtained, thereby re-executing the computational operation as shown in FIG. 4 based on the images L and R at time t1.

The amount of image movement between time t0 and time t1 can be obtained by means of equation (17) below.

$$\Delta Z01 = |\Delta XR - \Delta XL| \qquad (17)$$

Thus, the distance ΔZ' between the two images at time t2 can be predicted by means of equation (18) below.

$$\Delta Z' = \Delta Z1 + \{(t2-t1)/(t1-t0)\} \cdot (\Delta XR - \Delta XL) \qquad (18)$$

Therefore, the moving object can be held in-focus at time t2 by driving the lens by an amount defined by ΔZ'.

On the other hand, if the relationship of $Sk \leq \beta$ does not hold true in Step B10, the CPU 201 proceeds to Step B12, where set the detection disabled flag.

If the amount of image movement ΔXL or ΔXR of the object is too large to be dealt with the embodiment, the CPU 201 judges that no focusing operation is feasible and it does not predict any image shift.

If, on the other hand, the amount of movement of the image of the object is very small and can be regarded as detection error, the CPU 201 determines that the amount of movement equal to 0.

Note that a large value will be selected for the threshold for the judgment on the amount of movement when the image of the object is expected to move greatly relative to the amount of movement of the object itself due to the focal length, the distance between the object and the camera and the brightness of the object and/or other factors.

Figure 8A:
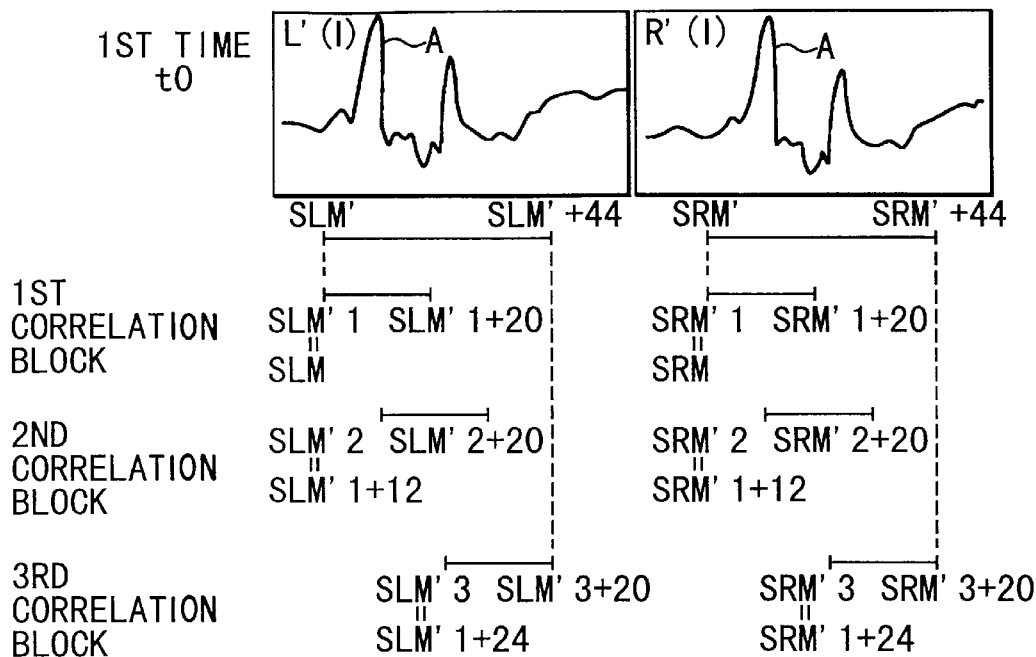
FIGS. 8A and 8B are graphs illustrating an operation of computationally determining the amount of image movement at time t0 and t1 respectively.
Figure 8B:
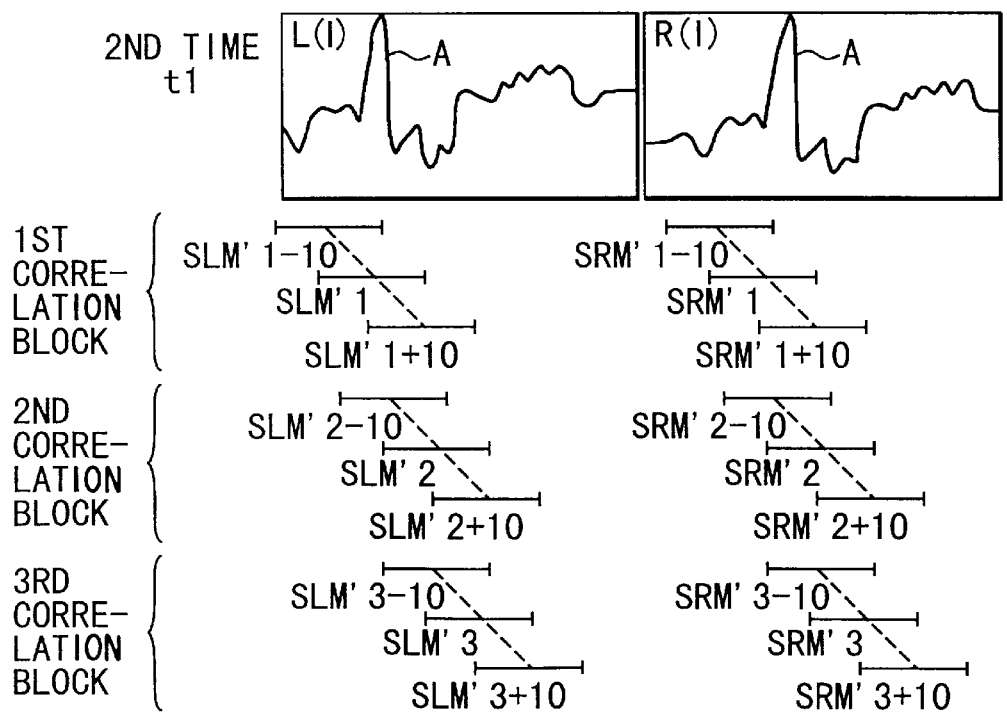

FIGS. 8A and 8B show object image signals L'(I) and R'(I) at time t0 and object image signals L(I) and R(I) at time t1 of a moving object.

Referring to FIGS. 8A and 8B, SLM' and SRM' represent the respective numbers of the leading pixels of transducer rows of the block (44 pixels) for a minimal FMIN when the amount of image shift is detected for object image L'(I) and object image R'(I) as described earlier.

As described above by referring to FIG. 6, when a computational operation is executed for the correlation between the object image signal at time t0 and the object image signal at time t1 to determine the amount of movement of image L and that of image R, the CPU 201 divides the 44 pixels of the block typically to produce three blocks for determining the amount of image movement.

In the case of FIGS. 8A and 8B, the pixels of the block are divided to form three blocks of first through third blocks, each comprising 20 pixels.

With regard to image L, the number of the leading pixels of the row of transducers of each of the small blocks will be SLM'1 (=SLM') for the first block, SLM'2 (=SLM'1+12) for the second block and SLM'3 (=SLM'1+24) for the third block.

Thus, in the operation of determining the amount of image movement for each of the blocks, firstly, the amount of image movement is determined for the first block, using the relationship of SLSTR=SLM'1 as shown in FIG. 6.

Then, the amount of image movement is determined for the second block, using the relationship of SLSTR=SLM'2.

Lastly, the amount of image movement is determined for the third block, using the relationship of SLSTR=SLM'3.

Similarly for image R, the amount of movement is determined for each of the first through third blocks and the amount of image movement $\Delta Z01$ between time t1 and time t0 is determined by means of equation (17).

FIG. 19 shows the reliability coefficient Sk, the amount of movement $\Delta XL$ of object image signal L, the amount of movement $\Delta XR$ of object image signal R, the amount of image amount of movement $\Delta Z01$ between time t1 and time t0 for each of the blocks obtained for the object image signals in FIGS. 8A and 8B.

As seen from FIG. 19, a high reliability is observed for the first block to prove that the result of the computational operation for determining the amount of image movement is highly reliable.

Thus, the CPU 201 can predict the movement of the object to be photographed by using the result of the computational operation for the first block.

When the object is moving, the possibility of obtaining a high reliability for all the blocks is low because of the following reason.

Generally, tens of several milliseconds pass between time t0 and time t1 and, if the camera is fixed for taking a photograph of the moving object, the camera shoots the object at time t1 that appears differently, if partly, from time t0.

In other words, if the amount of image movement is determined by computation for a portion of the object image signal that is differentiated between time t0 and time t1, then the reliability of the computation will inevitably be low. On the other hand, the reliability of the computation will be high if the amount of image movement is computationally determined for a portion of the object image signal that is not differentiated between time t0 and time t1.

Referring to FIGS. 8A and 8B, the portion of the signal denoted by A remains same between time t0 and time t1 and hence the result of the computational operation is high for the first block.

Contrary, the portion is differentiated between time t0 and time t1 for the second and third blocks and hence the result of the computational operation is low for each of the blocks.

On the other hand, FIGS. 9 and 9 show object image signals L'(I) and R'(I) at time t0 and object image signals L(I) and R(I) at time t1 of a stationary object.

Note that same reference symbols are used respectively for same denotations throughout FIGS. 8A, 8B, 9A and 9B.

Figure 9A:
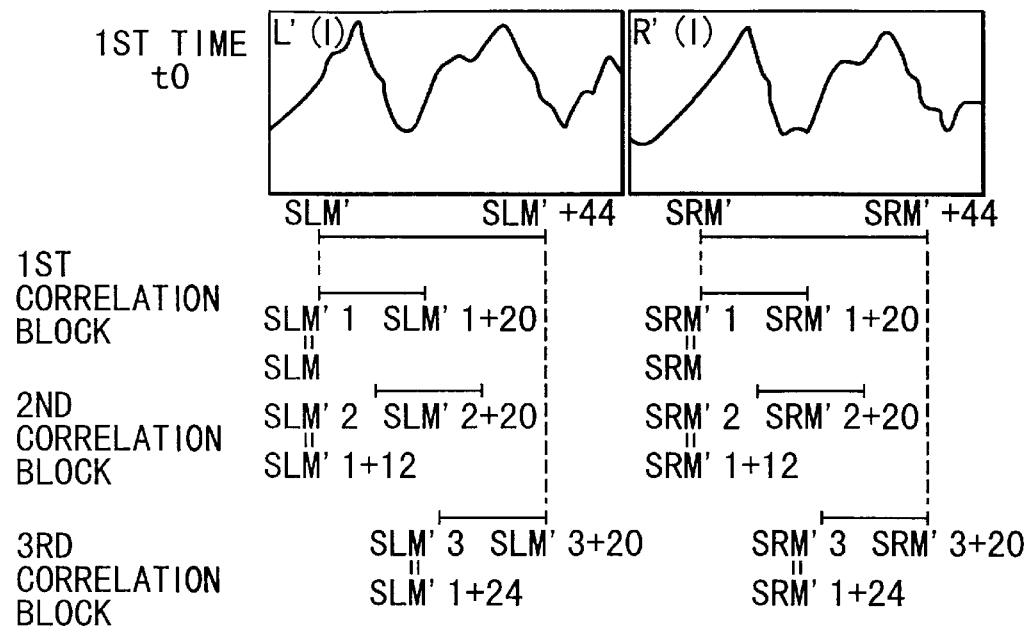
FIGS. 9A and 9B are graphs illustrating object image signals L'(I) and R'(I) at time t0 and object image signals L(I) and R(I) at time t1 that can be produced when the object is stationary.
Figure 9B:
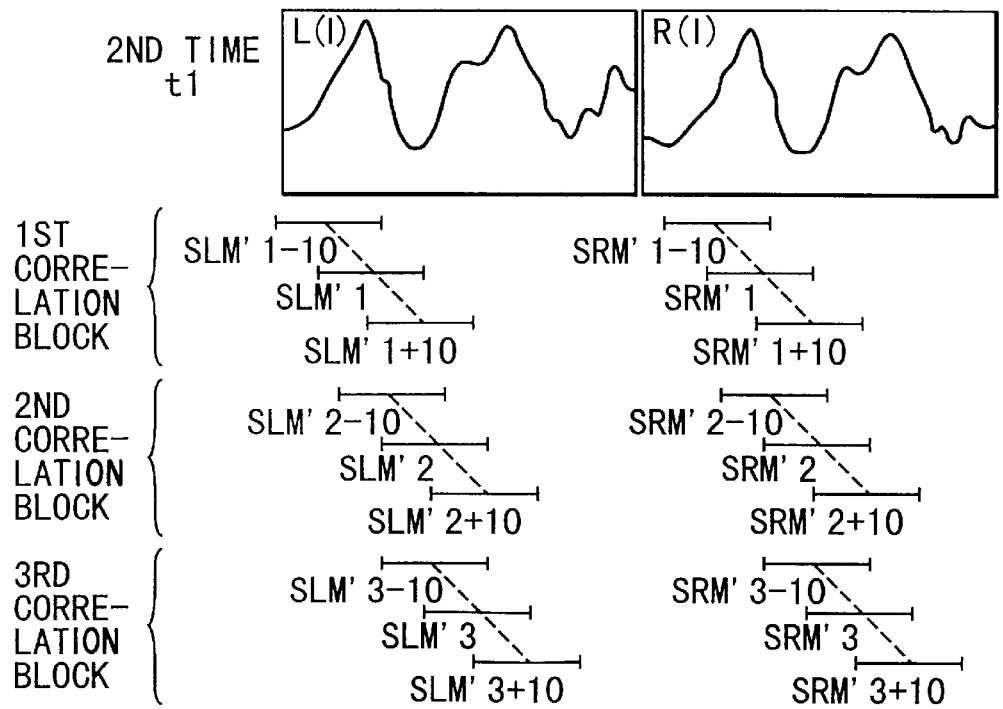

FIG. 20 shows the reliability coefficient Sk, the amount of movement $\Delta XL$ of object image signal L, the amount of movement $\Delta XR$ of object image signal R, the amount of image amount of movement $\Delta Z01$ between time t1 and time t0 for each of the blocks obtained for the object image signals in FIGS. 9A and 9B.

While the amount of image movement $\Delta Z01$ in FIG. 20 is supposed to be equal to 0 because the object is stationary, it is actually not equal to 0 due to the computational errors and the noises that can be generated by the AFIC 240.

Thus, the difference in the amount of image movement may be referred to as detection error.

It will be understood that a substantially same object image signal is obtained for time t0 and time t1 because the object is stationary and hence the reliability of the computational operation will be high for each of the first through third blocks.

Thus, from the viewpoint of the first embodiment, a moving object and a stationary object differ from each other remarkably in that the former can provide a high reliability only for some of the blocks, whereas the latter can provide a high reliability for all the blocks.

Here lies the point of the present invention.

With any of the comparable known techniques where the amount of movement of the image of the object obtained by an computational operation is compared with a predetermined amount of movement (threshold level) to determine if the object is moving or not, the threshold level has to be determined by taking various possible errors into consideration so that a relatively large value should be selected for the threshold level. With such an arrangement, then, a moving object can often be mistaken for a stationary object.

The point of the present invention lies in that, according to the invention, an object is determined to be moving or stationary highly reliably by taking the correlation between the object image signal at time t0 and the signal at time t1 in addition to the use of the computed amount of movement for the judgment.

More specifically, if the computed amount of movement of the image exceeds a threshold level, the object is determined to be stationary if a high reliability (inter-signal correlation) is obtained for all the blocks.

Now, the entire operation of a camera provided with the first embodiment will be described by referring to the flow chart of FIG. 10.

The CPU 201 is a microcomputer that operates for sequence control and executes various computational operations for the entire camera.

As the main switch (not shown) of the camera is turned on by the user, the CPU 201 is reset by the power-on action and starts its operation. Firstly, it initializes the I/O port and the RAM ((Step C1).

Then, the CPU 201 computationally determines the output of the photometric device 233 by means of the photometric circuit in the interface IC 202 and also executes computational operations for determining the exposure time and the aperture to be set for the apex of the camera (Step C2).

Subsequently, the CPU 201 computationally determines the output of the AFIC 240 in a manner as described earlier and executes computational operations for the AF system including that of predicting the movement of the object if the latter is determined to be moving (Step C3).

The Step C3 will be described in greater detail hereinafter.

A camera to be used with the first embodiment comprises a release button (not shown) having a two-stage stroke so that the photometric operation and the AF operation including the lens driving of the camera are completed in the first half-stroke (referred to as 1R hereinafter) and the film is exposed to light in the second half-stroke (referred to as 2R hereinafter).

Then, the CPU 201 determines if 1R is on or off (Step C4) and, if 1R is found to be off, it returns to Step C2.

If, on the other hand, if 1R is found to be on in Step C4, the CPU 201 outputs a command for driving the lens by the lens drive stroke computationally determined in Step C3 (Step C5).

This operation in Step C5 will be described in greater detail hereinafter.

Then, the CPU 201 determines if the lens is infocus or not (Step C6).

This operation is performed by seeing the in-focus flag as will be described hereinafter.

If it is determined that the lens is not in-focus, the CPU 201 determines if 2R is on or off (Step C7) and, if 2R is found to be off, returns to Step C3.

If, on the other hand, 2R is found to be on in Step C7, it outputs the command for driving the iris diaphragm to the level of opening computationally determined in Step C2 (Step C8) and, at the same time, a command for driving the main mirror to move up (Step C9).

Then, the CPU 201 controls the shutter 118 to operate for the exposure time and the aperture determined in Step C2 (Step C10).

Then, the CPU 201 controls the main mirror 102 to move down after the predetermined exposure time of the shutter 118 (Step C11) and, at the same time, issues a command for setting the aperture to its open position (Step C12). Thereafter, it issues a command for driving the shutter 118 to the initial position (Step C13) and, at the same time, a command for taking up the film by a single stroke (Step C14). Then, the CPU 201 returns to Step C2 and repeats the above sequence.

Now, the AF subroutine of Step C3 in FIG. 10 will be described by referring to the flow chart of FIG. 11.

Firstly, in Step D1, the CPU 201 executes the AF detection subroutine which will be described in greater detail hereinafter.

The subroutine is designed to computationally determine the amount of image shift ΔZ from the time of starting an integration by AFIC 240 and include a computation for predicting the movement of a moving object.

The CPU 201 determines if it is possible to conduct an AF detection or not by means of a detection disabled flag (Step D2).

If it is not possible to conduct an AF detection, the CPU 201 clears the in-focus flag (Step D3) and returns.

If, on the other hand, it is possible, the CPU 201 then determines if a continuous AF mode is in place or not by means of a continuous AF flag (Step D4).

If it is determined in this step that a continuous AF mode is not in place, the CPU 201 proceeds to Step D6 because it does not have to determine if the operation is the first focusing or not.

If, on the other hand, it is determined that a continuous AF mode is in place, the CPU 201 determines if the operation is the first focusing or not by means an end-of-first-computation flag (Step D5).

The CPU 201 proceeds to Step D3 if it is determined that the operation is the first focusing, whereas the CPU 201 proceeds to Step D6 for determining the amount of defocus if it is determined that the operation is the second focusing.

In Step D6, the CPU 201 computationally determines the amount of defocus by means of the amount of image shift determined in Step D1 and equation (8) or (9).

Subsequently, the CPU 201 compares the determined amount of defocus and an in-focus reference value (Step D7).

The in-focus reference value is determined by means of a permissible circle of confusion.

If the computed amount of defocus is found to be less than the in-focus reference value, the CPU 201 determines that the object is in-focus.

If the amount of defocus is determined to be less than the in-focus reference value in Step D8, the CPU 201 sets an in-focus flag (Step D9) and returns because it does not have to drive the lens.

If, on the other hand, the amount of defocus is determined to be greater than the in-focus reference value, the CPU 201 clears the in-focus flag (Step D10) and computationally determines the amount by which the lens is driven to bring the object in-focus (Step D11) before it returns.

Figure 12:
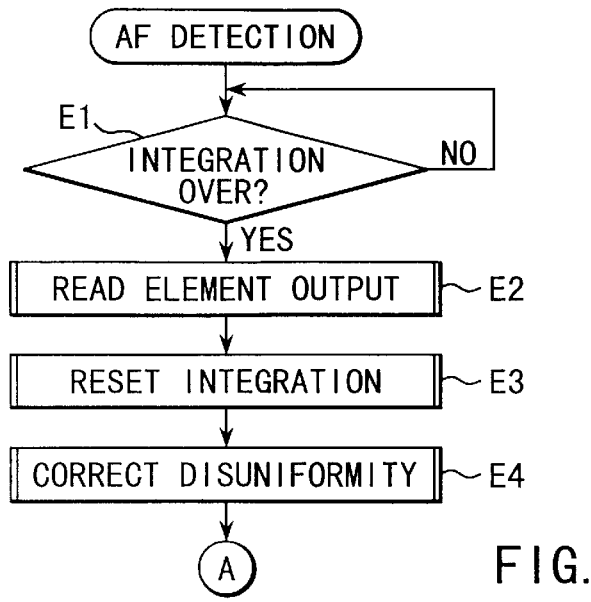
FIG. 12 is a flow chart of the AF detection subroutine.
Figure 13:
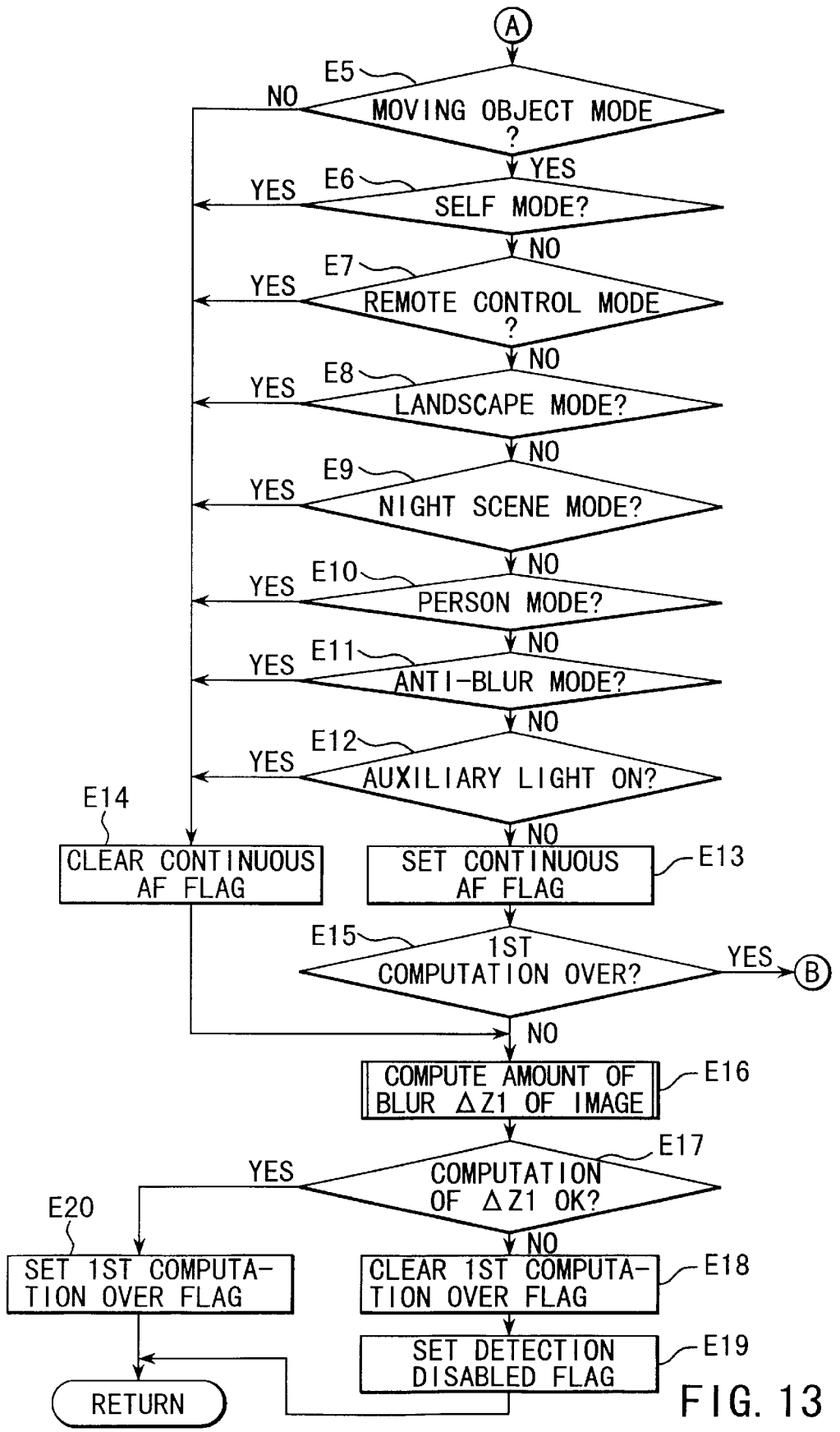
FIG. 13 is another flow chart of the AF detection subroutine.
Figure 14:
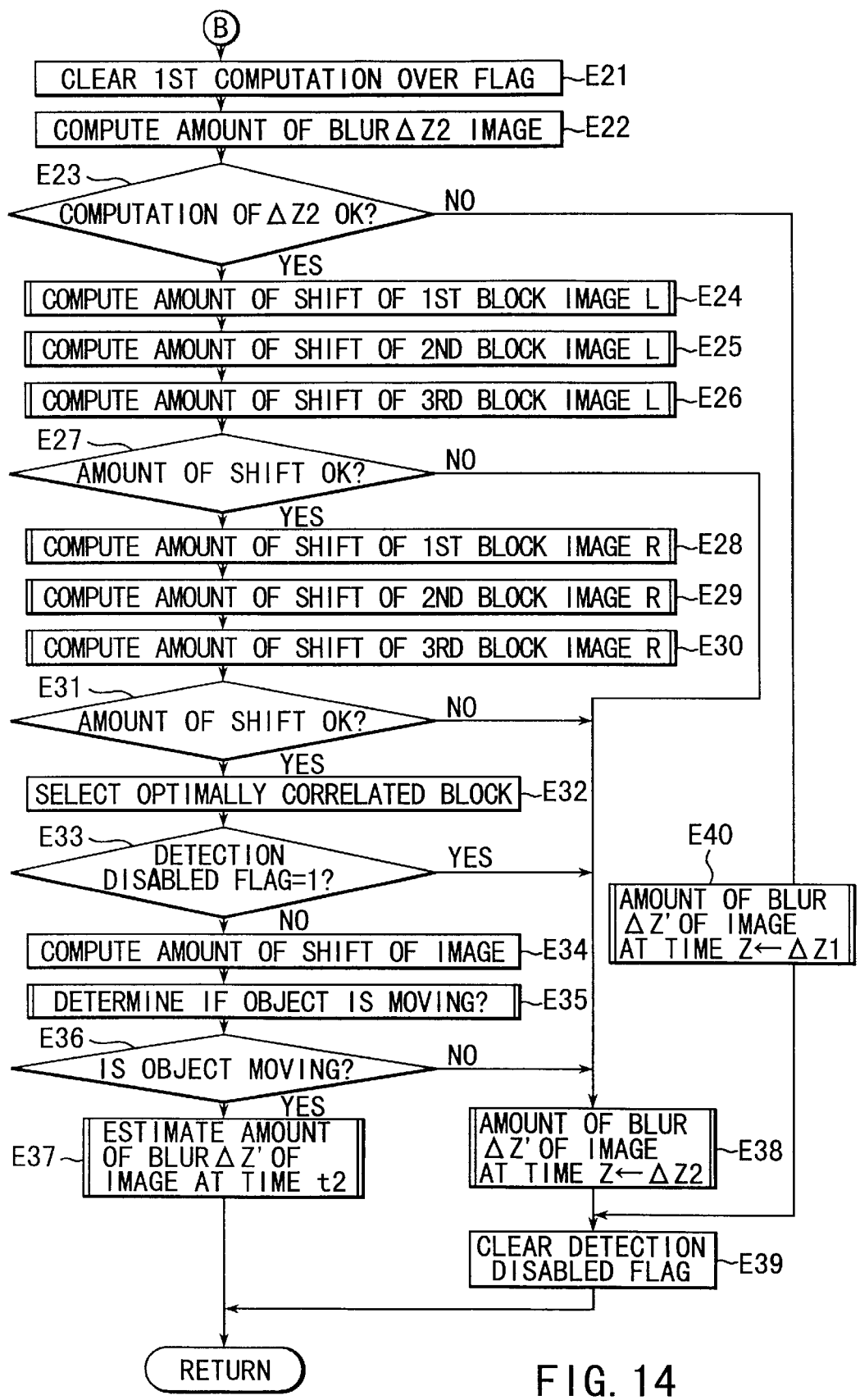
FIG. 14 is still another flow chart of the AF detection subroutine.

Now, the AF detection subroutine will be described by referring to the flow charts in FIGS. 12 through 14.

Firstly, the CPU 201 waits for the end of integration of the AFIC 240 (Step E1).

Then, the CPU 201 reads out the data on all the elements (pixels) on a pixel by pixel basis as the output of the AFIC 240 (Step E2).

Since the output of the AFIC 240 is an analog output, the CPU 201 converts it into a digital signal on a pixel by pixel basis by means of the A/D converter in the CPU 201 and stores the signal in a predetermined memory area.

Then, the CPU 201 resets the operation of integration of the AFIC 240 (Step E3).

Thereafter, the CPU 201 corrects the disuniformity, if any, in the obtained object image signal (Step E4).

This is for correcting the delicate variances found among the pixels in the AFIC 240 that might have been produced in the course of manufacturing the camera and the disuniformity in the illuminance of the re-imaging optical system in the AF unit 210.

More specifically, the CPU 201 regulates the output of each of the pixels to make it equal to that of the least sensitive pixel for the output of the AFIC 240.

The correction coefficient to be used for this correcting operation is determined for the camera and stored in the EEPROM 237 at the time of manufacture.

The correction coefficient is described in detail in U.S. Pat. No. 5,208,652, which is assigned to the assignee of the present patent application.

Subsequently, the CPU 201 determines if a moving object mode (for predicting the movement of a moving object) is selected or not (Step E5), if a self-timer photographing mode is selected or not (Step E6), if a remote control photographing mode is selected or not (Step E7), if a landscape photographing mode is selected or not (Step E8), if a night scene photographing mode is selected or not (Step E9), if a person photographing mode is selected or not (Step E10), if an anti-shake mode is selected or not (Step E11) and if the auxiliary light LED 242 is on or not during the current operation of integration or not (Step E12).

The CPU 201 sets an continuous AF flag only when it is found as a result of the above eight steps that the moving object mode is selected but all the remaining photographing mode are not selected and the auxiliary light is off (Step E13).

If the flag is set, the CPU 201 performs a movement predicting AF as will be described below.

If otherwise, on the other hand, the CPU 201 clears the continuous AF flag (Step E14) and proceeds to Step E16 so that it does not perform any movement predicting AF.

If the auxiliary light is on or not is determined in Step E12 because, when the auxiliary light LED 242 is on, it means that a dark object is to be photographed and hence the accuracy of AF detection will be low so that a relatively large error can be expected in the result of the computational operation for predicting the movement of the object.

Basically, a long exposure time is required for a dark scene and not good for photographing a moving object.

Subsequently, the CPU 201 determines if the first computational operation of determining the amount of image shift is over or not (Step E15).

This is done by determining the current state of an end-of-first-computation flag that is set and cleared in Steps E18 and E20 as will be described hereinafter.

Figure 10:
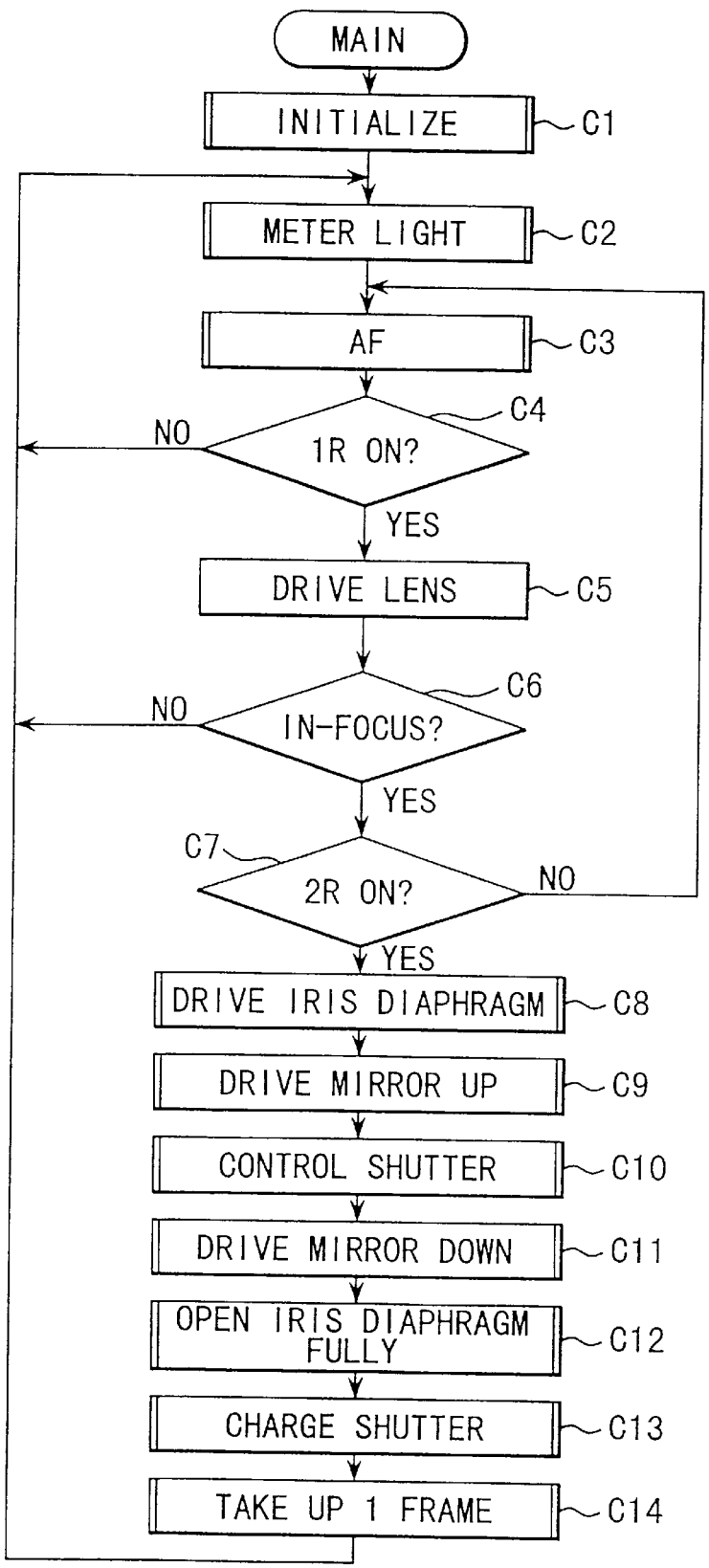
FIG. 10 is a flow chart of the entire operation of a camera to which the first embodiment of automatic focusing device is applied.

The flag indicates if the first computational operation of determining the amount of image shift is over or not and its initial value is cleared in advance in Step C1 as shown in FIG. 10.

If the first computational operation of determining the amount of image shift is not over, the CPU 201 executes a computational operation for detecting the correlation between two images in order to determine the amount of image shift ΔZ1 as described earlier by referring to FIG. 4 (Step E16).

Then, the CPU 201 determines if the amount of image shift ΔZ1 is computationally determined or not (Step E17).

In other words, the CPU 201 determines the current state of the detection disabled flag that is set and cleared in Steps A14 and A15 as shown in FIG. 4.

If a detection disabled state is detected in Step E17, the CPU 201 clears the end-of-first-computation flag (Step E18) and sets the detection disabled flag (Step E19) before it returns.

If, on the other hand, the CPU 201 determines that detection is possible in Step E17, it sets the end-of-first-computation flat (Step E20) and returns.

In the case where the CPU 201 detects a detection disabled state is detected, the CPU 201 proceeds to a lens scanning operation to detect a lens position that makes a detecting operation possible during the lens drive subroutine that will be described hereinafter.

If, on the other hand, it is determined in Step E15 that the first computational operation for determining the amount of image shift is over, the CPU 201 executes the second computational operation of determining the amount of image shift.

Firstly, the CPU 201 clears the end-of-first-computation for the second computational operation (Step E21).

Then, the CPU 201 computationally determines the amount of image shift ΔZ2 by executing a computational operation for determining the correlation as in the first computation (Step E22).

Thereafter, the CPU 201 determines if the amount of image shift ΔZ2 can be computationally determined or not as in the first computation in Step E17 (Step E23).

If it is found that the amount of image shift ΔZ2 cannot be computationally determined, the CPU 201 proceeds to Step E40 and uses ΔZ1 that has been computationally obtained as the amount of image shift ΔZ' at time t2.

If, on the other hand, it is found that the amount of image shift ΔZ2 can be computationally determined, the CPU 201 determines the amount of shift of image L of the first block according to the flow chart of FIG. 6 by computationally determining the correlation for image L for the first block as described earlier by referring to FIGS. 8A, 8B, 9A and 9B (Step E24).

Subsequently, the CPU 201 determines the amount of shift of image L of the second block and that of the third block by computational determining the correlation for image L for both the second and third blocks (Steps E25, E26).

Thereafter, the CPU 201 determines if the obtained amount of image shift for each of the three blocks is greater than a predetermined first reference value or not (Step E27).

The first reference value is relatively large and Step E27 is provided for occasions where the object to be photographed moves out of the focusing area of the viewfinder and cannot be put in-focus anymore or where the object is moving too fast and it is impossible to put it in-focus if its movement is predictable.

If the computationally determined amount of movement of image L is greater than the first reference value, the CPU 201 determines that the movement of the object is not predictable and proceeds to Step E38.

Then, the CPU 201 performs an computational operation for the amount of movement of image R in the same way (Steps E28, E29 and E30) and determines if the obtained amount is acceptable or not (Step E31).

If the computationally determined amount of movement of image R is greater than the first reference value, the CPU 201 determines that the movement of the object is not predictable and proceeds to Step E38.

Then, the CPU 201 selects the block showing the highest correlation on the basis of the reliability coefficients obtained for the first through third blocks.

In other words, the CPU 201 selects the block having the smallest reliability coefficient Sk (Step E32).

If the selected block is not detectable, the CPU 201 proceeds to Step E38 for a detection disabled operation.

If, on the other hand, the selected block is detectable, the CPU 201 computationally determines the amount of image movement ΔZ01 during the first and second integrating operations of the AFIC 240 by means of equation (17).

Then, the CPU 201 determines if the object to be photographed is moving or not (Step E35).

Then, the CPU 201 determines the current state of the moving object flag which is the output of the Step E35 (Step E36) and, if it is determined that the object is moving, the CPU 201 predicts the amount of image shift ΔZ' in the future by means of equation (18).

Then, the CPU 201 clears the detection disabled flag (Step E39) and returns.

If, on the other hand, it is determined that the object is stationary, the CPU 201 uses the amount of image shift ΔZ2 obtained in Step E22 for ΔZ' (Step E38) and returns because it does not have to predict the movement of the object.

Now, the time from the second computational operation to the actual exposure, or t2-t1 in equation (18) will be discussed in detail below.

For the purpose of the present invention, the time of prediction is fixed for the simplicity of control.

The time of prediction includes, among others, the time necessary for the CPU 201 to computationally predict the movement of the moving object, the time necessary to drive the lens and the time from 2R to the start of actual exposure, which is consumed to drive the mirror and the iris diaphragm.

Of these, the time necessary to drive the lens is most variable.

The time necessary for the CPU 201 to computationally predict the movement is substantially constant.

The time from 2R to the start of actual exposure is substantially constant unless the battery 212 is almost gone.

The time necessary to drive the lens differs significantly between the case where it is driven only for several pulses and the case where it is driven for hundreds of several pulses.

However, according to the invention, when the lens is driven to a large extent, a re-focusing operation is conducted after driving the lens by a predetermined amount in order to minimize the variance in the lens driving time as will be discussed in greater detail hereinafter.

Thus, the time of prediction can be substantially fixed to a predetermined level for the purpose of the invention.

Figure 15:
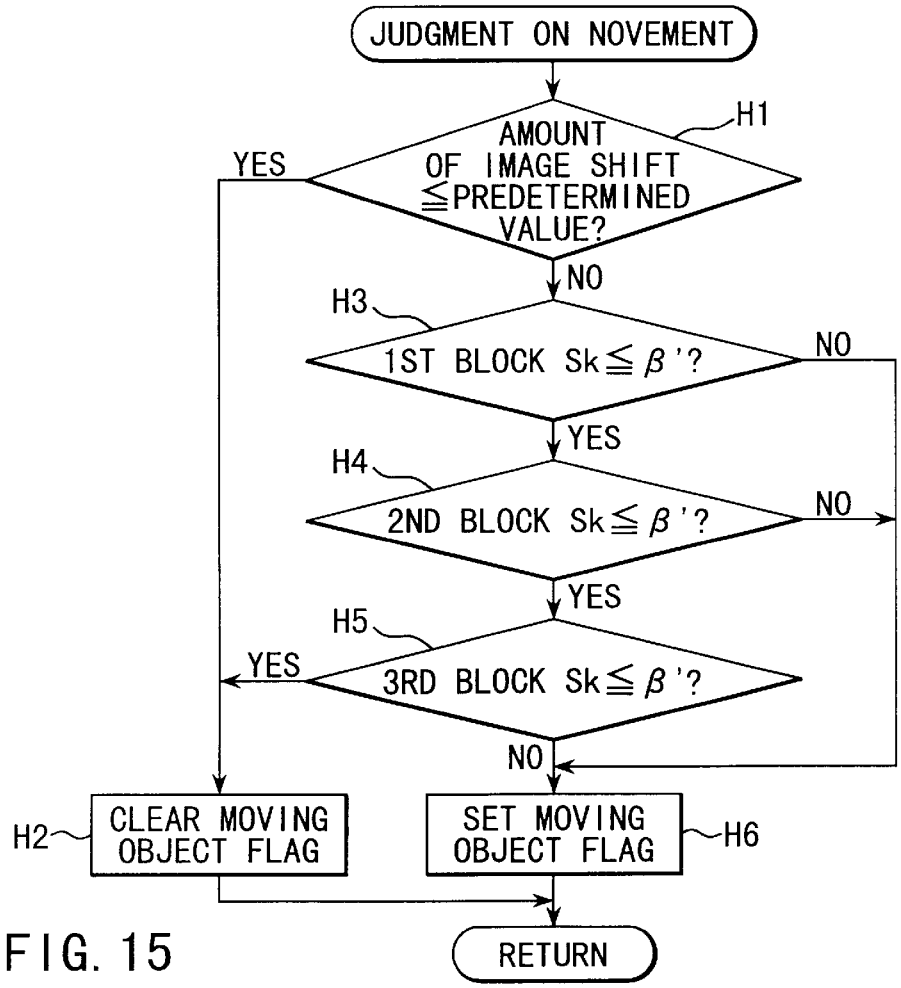
FIG. 15 is a flow chart of the movement judging subroutine.

Now, the judgment on movement subroutine of the invention will be described by referring to the flow chart of FIG. 15.

Firstly the CPU 201 determines if the amount of image movement obtained in Step E34 is smaller than the second reference value or not (Step H1).

Note that the second reference value is smaller than the first reference value described above and used in Step E27.

If the amount of image movement is smaller than the second reference value, the CPU 201 clears the moving object flag (Step H2) and returns.

Thus, the CPU 201 determines that the object is stationary.

If, on the other hand, the amount of image movement is greater than the second reference value, the CPU 201 subsequently determines if the reliability coefficients Sk of the first through third blocks are smaller than a predetermined value $\beta'$ or not in Steps H3, H4 and H5 respectively.

Note that the reference value $\beta'$ may be same as or different from the reference value $\beta$ used in Step B10 in FIG. 6.

If the reliability coefficient Sk of one or more than one of the first through third blocks is greater than the predetermined value $\beta'$ in Steps H3, H4 and H5, then the CPU 201 set the moving object flat (Step H6) and returns.

Thus, the CPU 201 determines that the object to be photograph is moving.

If the reliability coefficients Sk of all of the first through third blocks are smaller than the predetermined value $\beta'$ in Steps H3, H4 and H5, then the CPU 201 clear the moving object flat (Step H2) and returns.

Thus, the CPU 201 determine that the object to be photograph is stationary.

Figure 16:
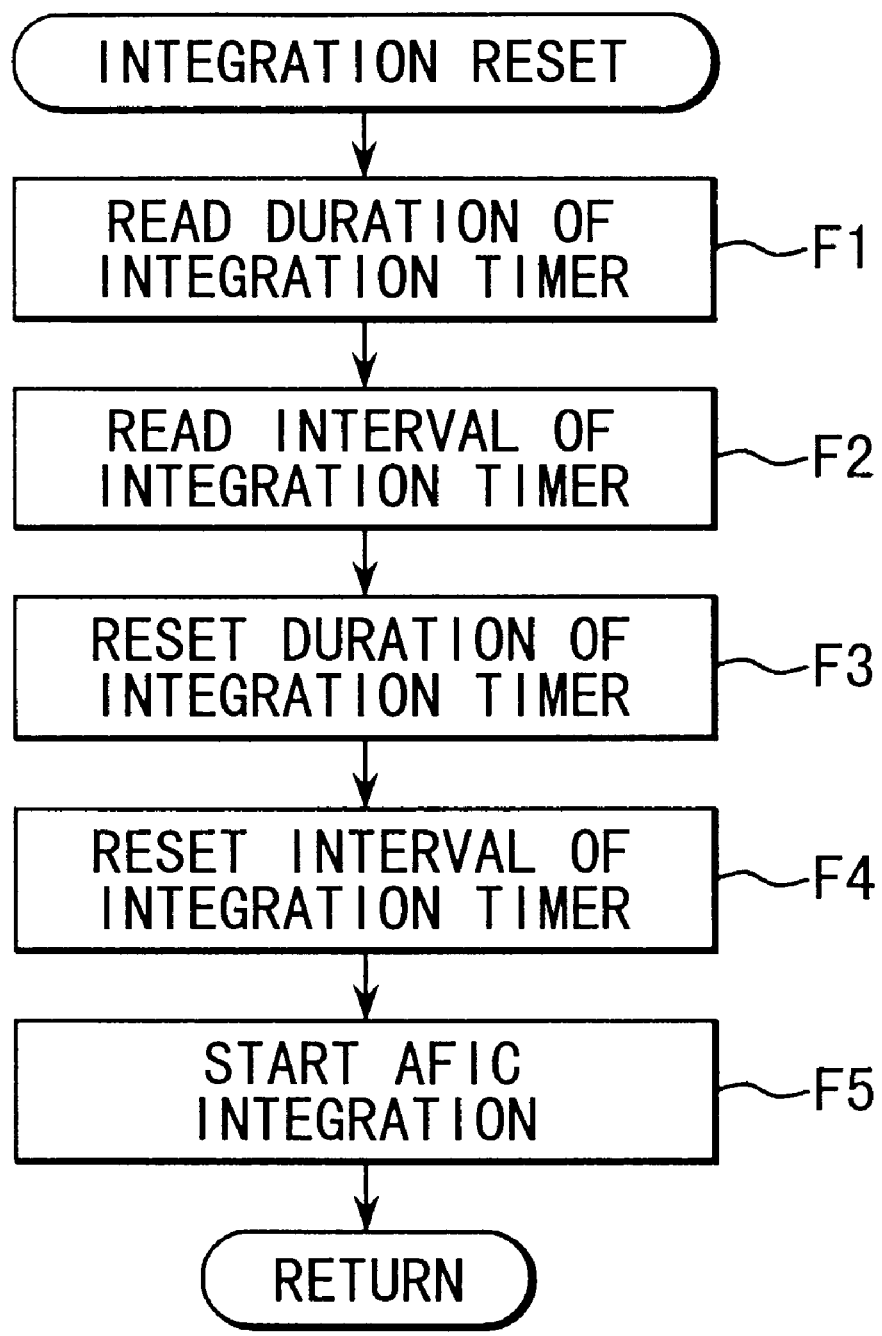
FIG. 16 is a flow chart of a subroutine integration reset operation to be executed in Step E3 in FIG. 12.

Now, the integration reset subroutine to be executed in Step E3 of FIG. 12 will be described by referring to the flow chart of FIG. 16.

Firstly, the CPU 201 reads in the reading of the duration of integration timer as the duration of the current integration (Step F1).

The integration timer may be so configured that it stops counting pulses of the timer contained in the CPU 201 in synchronism with, for example, the end-of-integration signal of the AFIC 240.

Then, the CPU 201 reads in the reading of the interval of integration timer as the interval between the last integration and the current integration (Step F2).

Thereafter, the CPU 201 resets both the duration of integration timer and the interval of integration timer (Step F3, F4).

Finally, the CPU 201 starts the next integration of the AFIC 240 and also the duration of integration timer and the interval of integration timer simultaneously (Step F5) and then returns.

Figure 17:
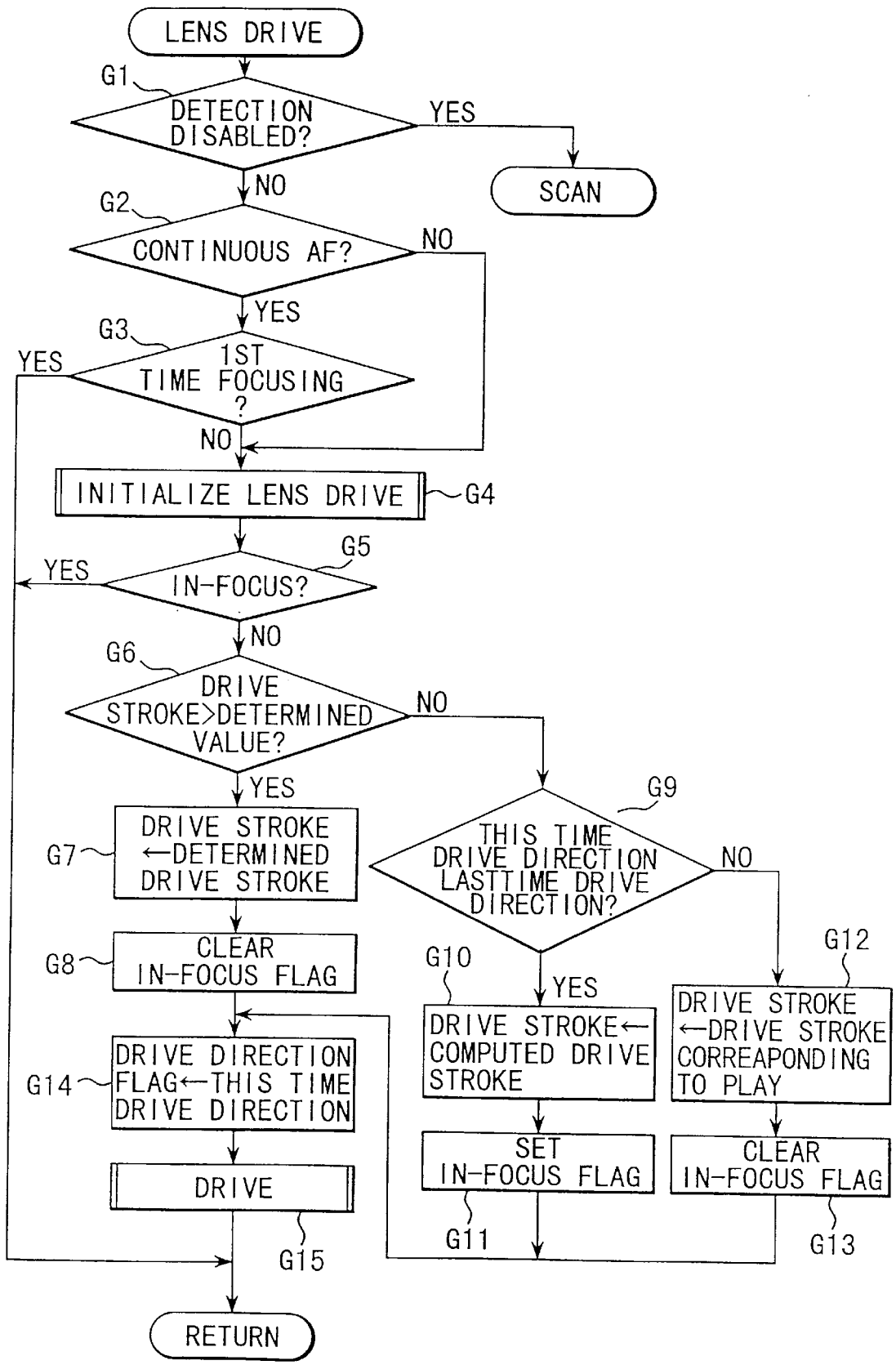
FIG. 17 is a flow chart of the lens drive subroutine of Step C5 in FIG. 10.

Now, the lens drive subroutine to be executed in Step C5 of FIG. 10 will be described by referring to the flow chart of FIG. 17.

Firstly, the CPU 201 determines if a movement detecting operation is possible or not by means of the detection disabled flag (Step G1).

If it is determined that no movement detection is possible, the CPU 201 proceeds to a lens scanning operation to find out a state where a movement detecting operation is possible.

If, on the other hand, it is determined that a movement detecting operation is possible, the CPU 201 proceeds to the next step to determine if it is continuous AF or not (Step G2).

If it is determined that it is not continuous AF, the CPU 201 proceeds to Step G4.

If, on the other hand, it is determined that it is continuous AF, the CPU 201 determines if it is the first focusing or not (Step G3).

If it is determined that it is the first focusing, the CPU 201 returns because it does not have to drive the lens.

If it is determined that it is the second focusing, the CPU 201 initializes to drive the lens (Step G4).

Then, the CPU 201 determines if the object is already in-focus or not (Step G5).

Figure 11:
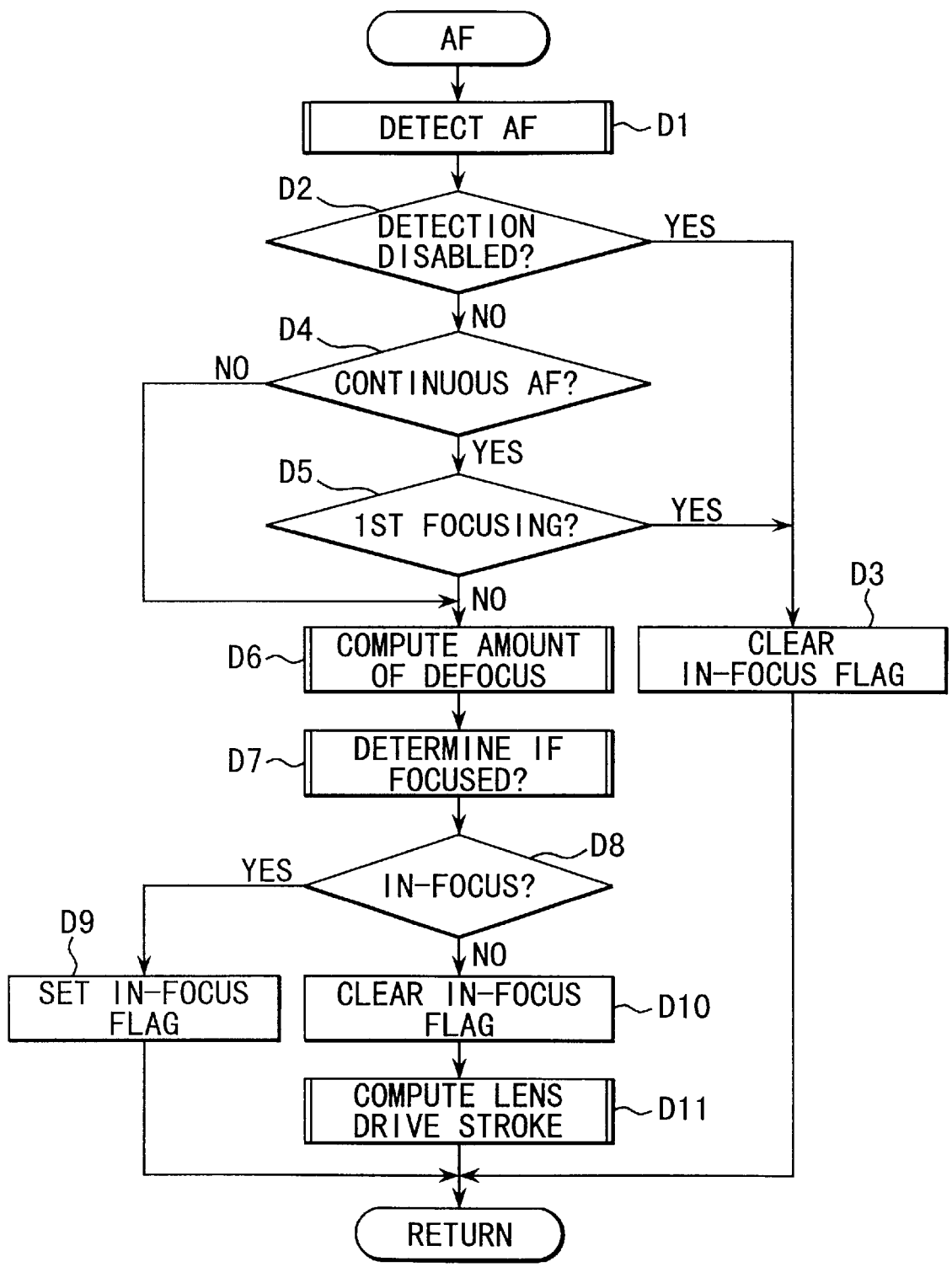
FIG. 11 is a flow chart of the AF (automatic focusing) subroutine of Step C3 in FIG. 10.

This is done on basis of the result of Step D7 of FIG. 11. If it is determined that the object is infocus, the CPU 201 returns because it does not have to drive the lens.

If, on the other hand, it is determined that the object is not in-focus, the CPU 201 will drive the lens in one of the three ways as described below according to the driving amount computationally obtained in Step D11 of FIG. 11.

Firstly, the CPU 201 determines if the driving amount obtained in Step D11 is greater than the driving amount reference value or not (Step G6).

If it is determined that the former is greater than the latter, the CPU 201 issues a command for driving the lens by a predetermined amount and then a command for re-focusing.

If, for example, the predetermined amount for driving the lens is equal to 150 pulses and the computationally obtained driving amount is equal to 250 pulses, the CPU 201 issues a command for driving the lens by predetermined 150 pulses and then returns to the lens drive subroutine to issue a command for refocusing.

Then, in Step G7, the CPU 201 drives the lens by the predetermined driving amount.

Thereafter, the CPU 201 clears the in-focus flag (Step G8) and proceeds to Step G14.

If, on the other hand, it is determined in Step G6 that the driving amount is smaller than the driving amount reference value, the CPU 201 determines if the driving direction (backward driving or forward driving) is same as that of the last drive operation or not (Step G9).

The determining operation of Step G9 is designed to determine if the gears of the drive system have a play.

If it is determined in Step G9 that the current driving direction is same as the last driving direction, the CPU 201 sets the driving amount obtained in Step D11 of FIG. 11 (Step G10) and sets the in-focus flag (Step G11) before it proceeds to Step G14.

If, on the other hand, it is determined that the current driving direction is different from the last driving direction, the CPU 201 sets a driving amount that corresponds to the play stored in the EEPROM 237 (Step G12) and clears the in-focus flag (Step G13) before it proceeds to Step G14.

In other words, if the gears have a play, the CPU 201 drives the lens to reduce the play before it issues a command for re-focusing. Thus, the next focusing operation is free from the problem of play, it can bring the object in focus by way of the operational route of Step G10.

Finally, the CPU 201 stores the current driving direction in the driving direction flag (Step G14) and drives the lens sequentially and stepwise by the amounts determined in Steps G7, G10 and G12 respectively in the direction determined in Step G14 (Step G15).

Now, a second embodiment of the invention will be described below.

In the second embodiment, the object to be photographed is determined as a stationary object when the detected amounts of movement of both the right and left images $\Delta XR$ and $\Delta XL$ are smaller than a reference value for all of the first through third blocks and as a moving object when the detected amount of image movement is greater than the reference value for at least one of the first through third blocks.

As described above by referring to FIGS. 19 and 20, the moving object in FIG. 19 shows that $\Delta XR$ or $\Delta XL$ is grater than the reference value.

The point of the second embodiment lies in the above fact.

Since the second embodiment differs from the first embodiment only in the "judgment on movement" subroutine, only this part of the embodiment will be described below.

Figure 18:
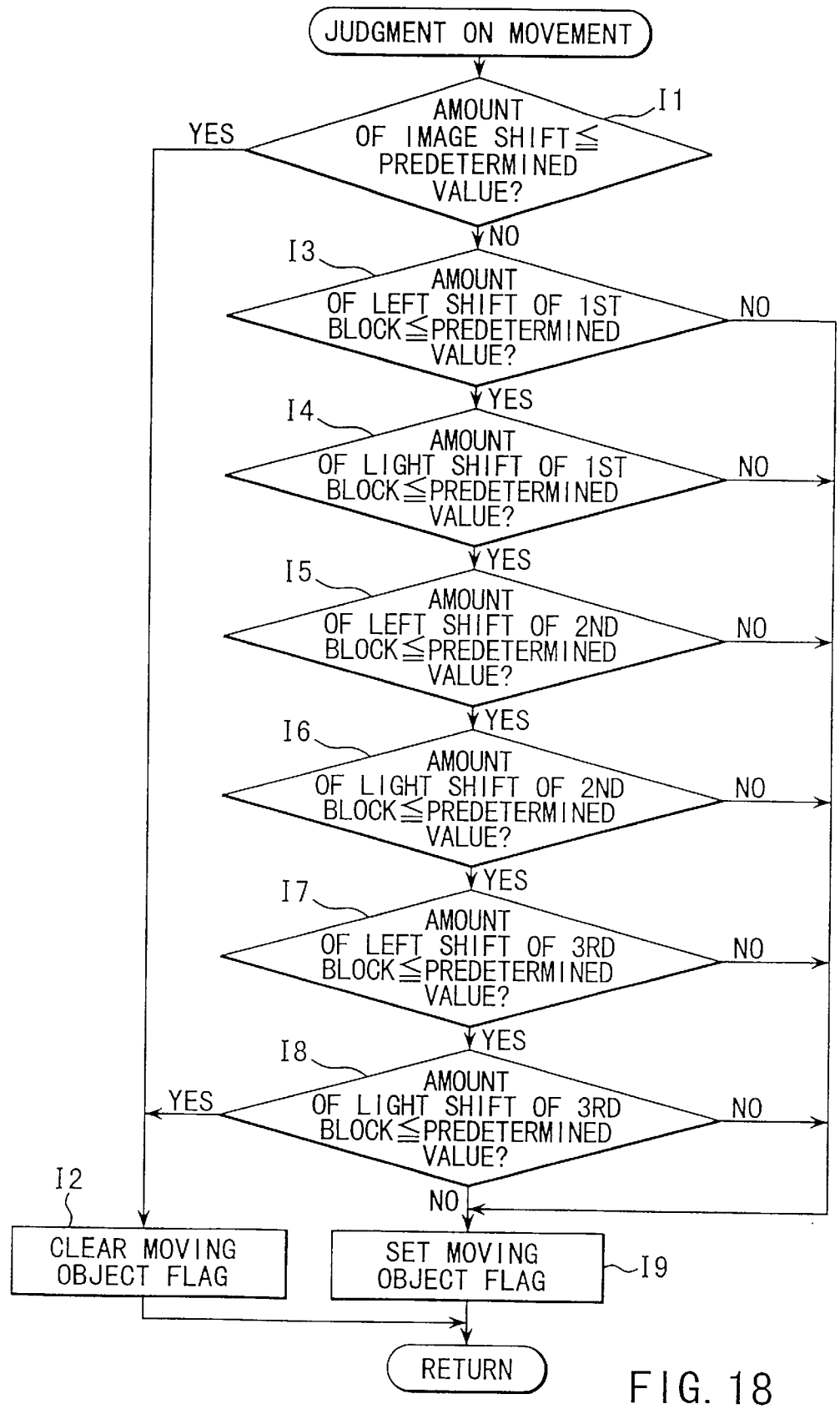
FIG. 18 is a flow chart of the movement judging subroutine of a second embodiment of automatic focusing device of camera according to the invention.

FIG. 18 is a flow chart for the "judgment on movement" subroutine of the second embodiment.

Firstly the CPU 201 determines if the amount of image movement as determined in Step E34 is smaller than the second reference value or not (Step I1).

Note that the second reference value is smaller than the first reference value used in Step E27.

If the amount of image movement is smaller than the second reference value, the CPU 201 clears the moving object flag (Step I2) and returns.

Thus, the CPU 201 determines that the object is stationary.

If, on the other hand, the amount of image movement is greater than the second reference value, the CPU 201 determines if the detected amounts of movement of both the right and left images ΔXR and ΔXL are smaller than a predetermined third reference value for each of the first through third blocks in Steps 13 through 18.

The third reference value may be same as or different from the second reference value.

If the detected amounts of movement of both the right and left images ΔXR and ΔXL are determined to be greater than the third reference value for at least one of the first through third blocks, the CPU 201 sets the moving object flag (Step I9) and returns.

Thus, the CPU 201 determines that the object to be photographed is moving.

Now, a third embodiment of the invention will be described.

The third embodiment is in fact a combination of the first and second embodiments and hence is adapted to more accurately determine if the object to be photographed is moving or stationary.

Since the third embodiment differs from the first and second embodiments only in the "judgment on movement", only this part of the embodiment will be described below.

Figure 21:
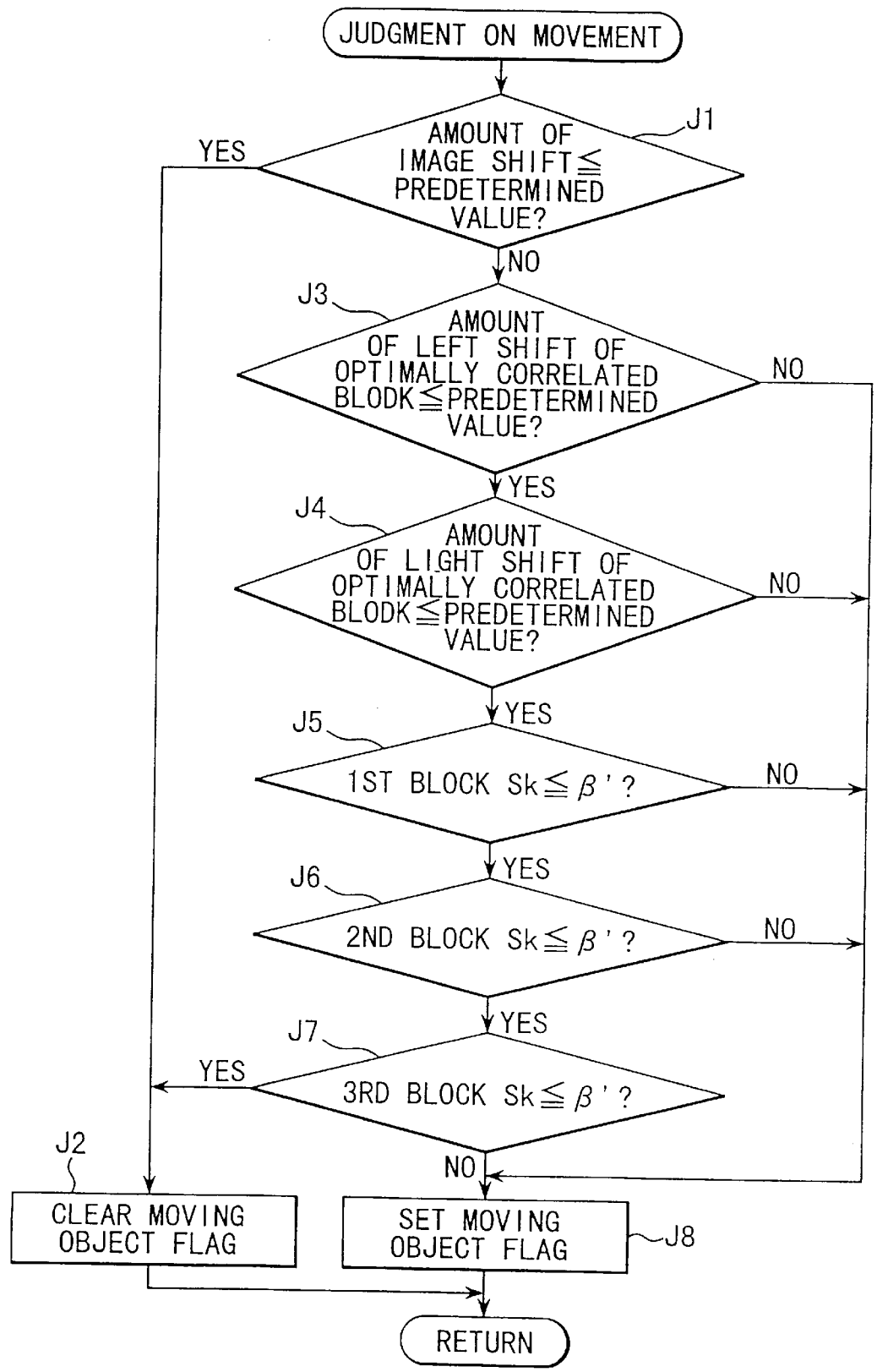
FIG. 21 is a flow chart of the movement judging subroutine of a third embodiment of automatic focusing device of camera according to the invention.

FIG. 21 is a flow chart for the "judgment on movement" subroutine of the third embodiment.

Firstly the CPU 201 determines if the amount of image movement as determined in Step E34 is smaller than the second reference value or not (Step J1).

Note that this step is identical as Step H1 of the first embodiment and Step I1 of the second embodiment.

If the amount of image movement is smaller than the second reference value, the CPU 201 clears the moving object flag (Step J2) and returns.

Thus, the CPU 201 determines that the object is stationary.

If, on the other hand, the amount of image movement is greater than the second reference value, the CPU 201 determines if the detected amounts of both right and left images ΔXR and ΔXL of the block having the highest correlation as determined in Step E32 are smaller than a third reference value or not in Steps J3 and J4 respectively.

If the CPU 201 determines either of the amount of movement of the right image or that of the left image is greater than the third reference value, it sets the moving object flat (Step J8) and returns.

Thus, the CPU 201 determines that the object to be photographed is moving.

If, on the other hand, the CPU 201 determines that the amounts of movement of both the right and left images are smaller than the third reference value, it determines if the correlation coefficient Sk of at least one of the first through third blocks is smaller than the predetermined value β' as cited above in Steps J5 through J7.

Note that Steps J5 through J7 are identical with Steps H3 through H5 of the first embodiment respectively.

If Sk of one or more than one of the first through third blocks is determined to be greater than β', the CPU 201 proceeds to Step J8, where it determines that the object is moving. If, on the other hand, Sk of at least one of the first through third blocks is greater than β', the CPU 201 proceeds to Step J8, where it determines that the object if moving. If Sk of any of the blocks is determined to be smaller than β', then the CPU 201 moves to Step J2, where it determines that the object is stationary.

Note that only the amount of image movement of the block having the highest correlation is judged in Steps J3 and J4 of the third embodiment in order to reduce the time required for the computational operation and, at the same time, use the amount of image movement of only the block having the highest correlation.

It will be appreciated that the amount of image movement may alternatively be judged for all the blocks as in the second embodiment.

While the present invention has been described in terms of the preferred embodiments, the present invention is by no means limited thereto and they may be altered or modified without departing from the scope of the invention.

For example, while a technique of predicting the movement of a moving object as disclosed in U.S. Pat. No. 5,802,625, which is assigned to the assignee of the present patent application, is used in the above embodiments, any other technique that can effectively detect a moving object and predict the movement of the object can alternatively be used for the purpose of the invention.

Additionally, while three blocks are used for the operation of computationally determining the correlation of images, it will be needless to say that the number of blocks is by no means limited to three.

Still additionally, while the object is determined to be stationary when a high reliability is achieved on the computational operation for all of the first through third blocks in any of the first through third embodiments, it may alternatively be so arranged as to determine that the object is stationary when a high reliability is achieved on the computational operation for more than one blocks.

Thus, according to the present invention, there is provided an automatic focusing device of camera that can reliably determine if the object is moving or stationary by simple means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An automatic focusing device of camera adapted to control a lens to focus on an object moving along an optical axis of the lens, said device comprising:

focus detecting means for outputting a plurality of focus detection signals with a predetermined interval in response to a focused state of an image of the object formed by said lens;

correlation computing means for computationally determining a correlation between a last focus detection signal and a preceding focus detection signal in order to predict a movement of the object according to the plurality of focus detection signals output from said focus detecting means;

reliability judging means for judging a reliability of a result of a computationally determining operation of said correlation computing means; and movement judging means for judging on the object to be moving or not according to the result of the computationally determining operation of said correlation computing means and a result of a reliability judging operation of said reliability judging means, wherein said movement judging means determines the object to be moving when it judges the result of the reliability judging operation of said reliability judging means as poorly reliable.

2. An automatic focusing device of camera according to claim 1, wherein said correlation computing means forms a plurality of signal blocks out of said focus detection signals and executes a computational operation for determining the correlation between the last focus detection signal and the preceding focus detection signal for each of the blocks; and said movement judging means determines the object to be stationary when said reliability judging means judges the reliability is low for at least one of the blocks.

3. An automatic focusing device of camera according to claim 2, further comprising:

amount of movement computing means for computationally determining an amount of movement of the image of the object in each of the blocks according to an output of said correlation computing means; and second movement judging means for determining the object to be moving or not according to an output of said amount of movement computing means.

4. An automatic focusing device of camera adapted to control a lens to focus on an object moving along an optical axis of the lens, said device comprising:

focus detecting means for outputting a plurality of focus detection signals with a predetermined interval in response to a focused state of an image of the object formed by said lens;

correlation computing means for forming a plurality of signal blocks out of said plurality of focus detection signals output from said focus detecting means and executes a computational operation for determining a correlation between a last focus detection signal and a preceding focus detection signal for each of the blocks;

amount of movement computing means for computationally determining an amount of movement of the image of the object in each of the blocks according to an output of said correlation computing means; and movement judging means for determining the object to be moving or not according to an output of said amount of movement computing means.

5. An automatic focusing device of camera according to claim 4, wherein said movement judging means determines the object to be moving when said amount of movement computing means determines that an amount of movement of the image of the object is greater than a predetermined amount of movement at least in one of the blocks.

6. An automatic focusing device of camera according to claim 4, further comprising:

reliability judging means for judging a reliability of a result of a computationally determining operation of said correlation computing means; and movement judging means for determining the object to be moving when the result of the computationally determining operation is determined to be lowly reliable by said reliability judging means.

7. An automatic focusing device for regulating the focus of a lens of a camera based on paired images of an object to be photographed formed by splitting a flux of light from the object into a pair of fluxes, said device comprising:

detecting means for serially outputting signals at regular intervals for the object as produced by photoelectrically converting an image of the object into a plurality of pixel signals;

memory means for storing the signals output from said detecting means for the object;

splitting means for forming a plurality of blocks of signals out of the signals output from said detecting means for the object; and movement judging means for determining the object to be moving or not based on a correlation between a last signal on each of the blocks formed by said splitting means and a preceding signal stored in said memory means for the object.

8. An automatic focusing device according to claim 7, wherein said movement judging means comprises a correlation evaluating means for evaluating said correlation and determines the object to be moving according to an output from the correlation evaluating means.

9. An automatic focusing device for regulating a focus of a lens of a camera based on paired images of an object to be photographed formed by splitting a flux of light from the object into a pair of fluxes, said device comprising:

detecting means for serially outputting signals at regular intervals for the object as produced by photoelectrically converting an image of the object into a plurality of pixel signals;

memory means for storing the signals output from said detecting means for the object;

splitting means for forming a plurality of blocks of signals out of the signals output from said detecting means for the object;

computing means for executing a computational operation on a last signal and a preceding signal stored in said memory means for the object to determine an amount of movement of said image of the object for each of the blocks formed by said splitting means; and movement judging means for determining the object to be moving or not based on an output from said computing means.

10. An automatic focusing device for regulating a focus of a lens of a camera based on paired images of an object to be photographed formed by splitting a flux of light from the object into a pair of fluxes, said device comprising:

detecting means for detecting said images of the object;

memory means for storing signals output from said detecting means for the object;

correlation evaluating means for evaluating a correlation between a last signal output from said detecting means and a preceding signal stored in said memory means for the object; and movement judging means for determining if the object is moving or not based on an output from said correlation evaluating means.

11. An automatic focusing device according to claim 10, further comprising:

splitting means for forming a plurality of blocks of signals out of the signals output from said detecting means for the object;

said movement judging means determining the object to be moving when at least one of correlation values output from said correlation evaluating means for the blocks is smaller than a predetermined value.

12. An automatic focusing device according to claim 11, wherein said correlation evaluating means comprises a reliability judging means for judging a reliability of a computation on the correlation between the last signal output from said detecting means and the preceding signals stored in said memory means for the object;

an amount of image movement being computationally determined by means of a correlation value of the block judged to be highly reliable by said reliability judging means.

13. An automatic focusing device for regulating a focus of a lens of a camera based on paired images of an object to be photographed formed by splitting a flux of light from the object into a pair of fluxes, said device comprising:

detecting means for detecting said images of the object;

memory means for storing signals output from said detecting means for the object;

correlation evaluating means for evaluating a correlation between a last signal output from said detecting means and a preceding signal stored in said memory means for the object; and control means for regulating the focus of the lens to put the object moving along an optical axis of the camera lens in-focus.

* * * * *